United States Patent
Raman et al.

(10) Patent No.: US 11,582,147 B2
(45) Date of Patent: Feb. 14, 2023

(54) ALLOCATING ADDITIONAL BANDWIDTH TO RESOURCES IN A DATACENTER THROUGH DEPLOYMENT OF DEDICATED GATEWAYS

(71) Applicant: VMware, Inc., Palo Alto, CA (US)

(72) Inventors: Chidambareswaran Raman, Sunnyvale, CA (US); Ganesh Sadasivan, Fremont, CA (US); Dileep K. Devireddy, San Jose, CA (US); Hongwei Zhu, Mountain View, CA (US); Sreenivas Duvvuri, San Ramon, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/344,959

(22) Filed: Jun. 11, 2021

(65) Prior Publication Data
US 2022/0377009 A1   Nov. 24, 2022

Related U.S. Application Data

(60) Provisional application No. 63/192,560, filed on May 24, 2021.

(51) Int. Cl.
*H04L 45/00* (2022.01)
*H04L 45/44* (2022.01)
*H04L 45/24* (2022.01)

(52) U.S. Cl.
CPC .............. *H04L 45/38* (2013.01); *H04L 45/24* (2013.01); *H04L 45/44* (2013.01); *H04L 45/72* (2013.01)

(58) Field of Classification Search
CPC ......... H04L 45/24; H04L 45/38; H04L 45/44; H04L 45/72
See application file for complete search history.

(56) References Cited

U.S. PATENT DOCUMENTS 8,830,835 B2   9/2014   Casado et al.
8,964,767 B2   2/2015   Koponen et al.
(Continued)

FOREIGN PATENT DOCUMENTS

| CN | 111478850 A | 7/2020 |
| WO | 2013026050 A1 | 2/2013 |
| WO | 2022060464 A1 | 3/2022 |

OTHER PUBLICATIONS

Non-Published Commonly Owned Related International Patent Application PCT/US2021/065169 with similar specification, filed Dec. 24, 2021, 66 pages, VMware, Inc.
(Continued)

*Primary Examiner* — Jeong S Park
(74) *Attorney, Agent, or Firm* — Adeli LLP

(57) ABSTRACT

Some embodiments provide policy-driven methods for deploying edge forwarding elements in a public or private SDDC for tenants or applications. For instance, the method of some embodiments allows administrators to create different traffic groups for different applications and/or tenants, deploys edge forwarding elements for the different traffic groups, and configures forwarding elements in the SDDC to direct data message flows of the applications and/or tenants through the edge forwarding elements deployed for them. The policy-driven method of some embodiments also dynamically deploys edge forwarding elements in the SDDC for applications and/or tenants after detecting the need for the edge forwarding elements based on monitored traffic flow conditions.

18 Claims, 25 Drawing Sheets

(56) References Cited

U.S. PATENT DOCUMENTS

| | | |
|---|---|---|
| 9,137,052 B2 | 9/2015 | Koponen et al. |
| 9,209,998 B2 | 12/2015 | Casado et al. |
| 9,288,081 B2 | 3/2016 | Casado et al. |
| 9,444,651 B2 | 9/2016 | Koponen et al. |
| 9,755,960 B2 | 9/2017 | Moisand et al. |
| 10,091,028 B2 | 10/2018 | Koponen et al. |
| 10,193,708 B2 | 1/2019 | Koponen et al. |
| 10,735,263 B1 | 8/2020 | McAlary et al. |
| 10,931,481 B2 | 2/2021 | Casado et al. |
| 11,005,710 B2 | 5/2021 | Garg et al. |
| 11,005,963 B2 | 5/2021 | Maskalik et al. |
| 11,171,878 B1 | 11/2021 | Devireddy et al. |
| 11,212,238 B2 | 12/2021 | Cidon et al. |
| 11,240,203 B1 | 2/2022 | Eyada |
| 11,362,992 B2 | 6/2022 | Devireddy et al. |
| 2011/0126197 A1 | 5/2011 | Larsen et al. |
| 2011/0131338 A1* | 6/2011 | Hu .................. H04W 76/11 709/229 |
| 2012/0054624 A1 | 3/2012 | Owens, Jr. et al. |
| 2013/0044641 A1 | 2/2013 | Koponen et al. |
| 2013/0044751 A1 | 2/2013 | Casado et al. |
| 2013/0044752 A1 | 2/2013 | Koponen et al. |
| 2013/0044761 A1 | 2/2013 | Koponen et al. |
| 2013/0044762 A1 | 2/2013 | Casado et al. |
| 2013/0044763 A1 | 2/2013 | Koponen et al. |
| 2013/0044764 A1 | 2/2013 | Casado et al. |
| 2013/0142203 A1 | 6/2013 | Koponen et al. |
| 2013/0185413 A1 | 7/2013 | Beaty et al. |
| 2013/0283364 A1* | 10/2013 | Chang ................ G06F 9/45558 726/12 |
| 2014/0334495 A1 | 11/2014 | Stubberfield et al. |
| 2014/0376367 A1 | 12/2014 | Jain et al. |
| 2015/0193246 A1 | 7/2015 | Luft |
| 2016/0105392 A1 | 4/2016 | Thakkar et al. |
| 2016/0127202 A1* | 5/2016 | Dalvi .................. H04L 49/354 709/226 |
| 2016/0170809 A1* | 6/2016 | Schmidt ............... G06F 3/0683 718/104 |
| 2016/0182336 A1 | 6/2016 | Doctor et al. |
| 2016/0234161 A1 | 8/2016 | Banerjee et al. |
| 2017/0033924 A1 | 2/2017 | Jain et al. |
| 2017/0063673 A1* | 3/2017 | Maskalik .............. H04L 43/20 |
| 2017/0195517 A1* | 7/2017 | Seetharaman ..... H04N 1/00087 |
| 2017/0353351 A1 | 12/2017 | Cheng et al. |
| 2018/0287902 A1 | 10/2018 | Chitalia et al. |
| 2018/0295036 A1 | 10/2018 | Krishnamurthy et al. |
| 2018/0332001 A1 | 11/2018 | Ferrero et al. |
| 2019/0104051 A1 | 4/2019 | Cidon et al. |
| 2019/0149360 A1 | 5/2019 | Casado et al. |
| 2019/0149463 A1 | 5/2019 | Bajaj et al. |
| 2019/0327112 A1 | 10/2019 | Nandoori et al. |
| 2021/0067375 A1 | 3/2021 | Cidon et al. |
| 2021/0067439 A1 | 3/2021 | Kommula et al. |
| 2021/0067468 A1 | 3/2021 | Cidon et al. |
| 2021/0075727 A1* | 3/2021 | Chen .................. H04L 63/0272 |
| 2021/0112034 A1* | 4/2021 | Sundararajan ........ H04L 47/726 |
| 2021/0126860 A1 | 4/2021 | Ramaswamy et al. |
| 2021/0136140 A1 | 5/2021 | Tidemann et al. |
| 2021/0184898 A1 | 6/2021 | Koponen et al. |
| 2021/0314388 A1 | 10/2021 | Zhou et al. |
| 2021/0359948 A1 | 11/2021 | Durrani et al. |
| 2022/0094666 A1 | 3/2022 | Devireddy et al. |

OTHER PUBLICATIONS

Non-Published Commonly Owned U.S. Appl. No. 17/091,734, filed Nov. 6, 2020, 42 pages, VMware, Inc.

Non-Published Commonly Owned U.S. Appl. No. 17/212,662, filed Mar. 25, 2021, 37 pages, VMware, Inc.

Non-published commonly owned related U.S. Appl. No. 17/344,956 with similar specification, filed Jun. 11, 2021, 61 pages, VMware, Inc.

Non-published commonly owned related U.S. Appl. No. 17/344,958 with similar specification, filed Jun. 11, 2021, 62 pages, VMware, Inc.

Non-Published Commonly Owned U.S. Appl. No. 17/839,336, filed Jun. 13, 2022, 50 pages, VMware, Inc.

PCT International Search Report and Written Opinion of Commonly Owned International Patent Application PCT/US2021/065169, dated Apr. 13, 2022, 10 pages, International Searching Authority (EPO).

* cited by examiner

ALLOCATING ADDITIONAL BANDWIDTH TO RESOURCES IN A DATACENTER THROUGH DEPLOYMENT OF DEDICATED GATEWAYS

BACKGROUND

Software defined datacenters (SDDCs) are typically protected from external networks by edge routers that perform middlebox service operations, such as firewall, network address translation (NAT), etc. All the external traffic is steered through the edge gateway. The external network bandwidth in an SDDC would be determined by the minimum of edge gateway uplink bandwidth and the host adapter network bandwidth. There are applications with flows that require a large bandwidth that consume a considerable amount of edge network capacity. These flows are often stateful, which require the traffic to be symmetrically processed at the same edge router. There is no solution that addresses these needs today. Because of this, customers are often asked to split their applications across multiple SDDCs so that they can get additional external network bandwidth. Each SDDC comes with its own management plane and this leads to management overheads. There is a need to be able to assign the large flows with dedicated bandwidth resource within the same SDDC.

SUMMARY

Some embodiments of the invention provide a method for deploying edge forwarding elements in a public or private software defined datacenter (SDDC). For an entity (e.g., tenant, business, department, etc.), the method deploys a default first edge forwarding element to process data message flows between machines of the entity in a first network of the SDDC and machines external to the first network of the SDDC (e.g., machines outside of the SDDC). The method subsequently receives a request to allocate more bandwidth to a first set of the data message flows entering or exiting the first network of the SDDC.

In response, the method deploys a second edge forwarding element to process the first set of data message flows of the entity in order to allocate more bandwidth to the first set of the data message flows, while continuing to process a second set of data message flows of the entity through the default first edge node. The method of some embodiments provides a novel way of making bandwidth available as any other user-selectable resource (like compute machines, service machines, network elements, etc.) in the SDDC.

The method in some embodiments receives the request for more bandwidth by first receiving a request to create a traffic group and then receiving a list of network addresses that are associated with the traffic group. The list of network addresses identifies the subset of the data message flows to be processed by the second edge node. The network addresses in some embodiments are network addresses associated with interfaces for connecting the machines in the first network to forwarding elements of the first network. In some embodiments, the method receives the list of network addresses associated with the traffic group by receiving a prefix of network addresses and then receiving a request to associate the prefix of network addresses with the traffic group. Based on this request, the method then creates an association between the traffic group and the received prefix of network addresses.

In some embodiments, the method deploys the second edge forwarding element by configuring the second edge forwarding element to forward data messages of the first set to forwarding elements in the external network, and configuring a set of forwarding elements in the first network to forward the first set of data message flows from a set of machines of the first network to the second edge forwarding element. The edge forwarding elements in some embodiments are edge routers. The method in some of these embodiments configures the second edge forwarding element by configuring the second edge forwarding element to advertise to forwarding elements in the external network routes to the set of machines.

The configured set of forwarding elements in the first network in some embodiments includes intervening routers. In some of these embodiments, the method configures the set of intervening routers by providing next-hop forwarding rules to the set of intervening routers. Alternatively, or conjunctively, the configured set of forwarding elements in some embodiments includes a set of intervening switches that implement a logical switch. In these embodiments, the method configures the set of intervening switches by providing forwarding rules to the set of intervening switches to direct the switches to forward the first set of data message flows to the second edge forwarding element through a set of tunnels that connect the set of intervening switches to the second edge forwarding element.

In some embodiments, the SDDC is a public cloud datacenter with a second network. In these embodiments, the first network is a private network that is defined in the second network to implement a virtual private cloud (VPC) for the entity in the public cloud datacenter. The first network is a segregated private physical network in some embodiments, while it is a logical overlay network in other embodiments.

The second edge forwarding element in some embodiments is a gateway in the public cloud datacenter. In some embodiments, the method deploys the second edge forwarding element by deploying the gateway and then configuring a set of forwarding elements in the second network of the public cloud datacenter to forward the first set of data message flows to the deployed gateway.

In some embodiments, the method deploys the first and second edge forwarding elements by deploying the first and second edge forwarding elements as separate first and second devices in the SDDC. The first and second devices are different edge forwarding appliances in some embodiments. In other embodiments, the first and second edge forwarding devices are two different machines executing on two different host computers.

After receiving the request to allocate more bandwidth to the first set of data message flows, the method of some embodiments receives a request to allocate more bandwidth to a third set of the data message flows of the entity that enter or exit the first network of the SDDC. The method deploys for the entity a third edge forwarding element to process the third set of data message flows in order to allocate more bandwidth to the third set of the data message flows, while continuing to process the second set of data message flows through the default first edge node and to process the first set of data message flows through the second edge node.

Like the request for allocating more bandwidth for the first set of data message flows, the method in some embodiments receives the request for more bandwidth for the third set of data message flows by first receiving a request to create another traffic group, receiving another prefix of network addresses that identify the third set of data message flows, and then receiving a request to associate the newly received traffic group with the newly received address prefix. In some embodiments, the address prefixes for the first and third data message flows can overlap. In such cases, the method resolves the overlap by assigning the overlapping addresses to the traffic group that more specifically identifies the addresses. For instance, if the first list of addresses for the first data message flow set is specified in terms of a range of IP addresses (192.168.200.0/24) while the second list of addresses for the third data message flow set specifies a specific address (192.168.200.10) in this range, the method assigns the more specific address to the second traffic group that identifies the third data message flow set.

In some embodiments, the method deploys the second and third edge forwarding elements by deploying the second and third edge forwarding elements as different forwarding appliances, while in other embodiments it deploys these forwarding elements by deploying different machines that execute on different host computers in the SDDC. Using different host computers to implement different edge forwarding elements for different sets of data message flows allows dedicated resources (e.g., physical network interface cards (PNICs)) of the different host computers to be used for the different sets of data message flows.

Some embodiments provide policy-driven methods for deploying edge forwarding elements in a public or private SDDC for tenants or applications. For instance, the method of some embodiments allows administrators to create different traffic groups for different applications and/or tenants, deploys edge forwarding elements for the different traffic groups, and configures forwarding elements in the SDDC to direct data message flows of the applications and/or tenants through the edge forwarding elements deployed for them.

The policy-driven method of some embodiments also deploys edge forwarding elements in the SDDC for applications and/or tenants after detecting the need for the edge forwarding elements based on monitored traffic flow conditions. For instance, the method of some embodiments deploys, for a set of one or more applications, a first edge forwarding element to process data message flows associated with the application set. The method detects that the data message flows associated with the application set consume more than a threshold amount of bandwidth. Based on a policy that specifies allocation of additional bandwidth for data message flows associated with the application set when the data message flows consume more than the threshold amount, the method determines that additional bandwidth needs to be allocated for the data message flows associated with the application set in response to the detection, and then deploys, for the application set, a second edge forwarding element to process at least a portion of the data message flows associated with the application set in order to allocate more bandwidth to the application set. In some embodiments, the deploying, detecting, and determining operations are performed by a set of one or more controllers.

In some embodiments, the application set includes only one application that is implemented by several application instances executing on several host computers, with all the application instances performing a common set of operations of the application. Before the deployment of the second edge forwarding element, the first edge forwarding element processes all of the data message flows of all of the application instances of the application. After the deployment of the second edge forwarding element, the first edge forwarding element processes the data message flows of a first set of application instances of the application, while the second edge forwarding element processes the data message flows of a second set of application instances of the application.

Conjunctively, or alternatively, the application set in some embodiments includes a first application and a second application different from that of the first application. The first application is implemented by several application instances executing on a first set of one or more host computers to perform a common set of operations of the first application, while the second application is implemented by several application instances executing on a second set of one or more host computers to perform a common set of operations of the second application.

Before the deployment of the second edge forwarding element, the first edge forwarding element processes all of the data message flows of all of the application instances of the first and second applications. After the deployment of the second edge forwarding element, the first edge forwarding element processes the data message flows of the application instances of the first application, while the second edge forwarding element processes the data message flows of the application instances of the second application.

In some embodiments, the application set includes a multi-component application with several components that execute on several computers. Before the deployment of the second edge forwarding element, the first edge forwarding element processes all of the data message flows of each component of the application. After the deployment of the second edge forwarding element, the first edge forwarding element processes the data message flows of a first component of the first application, while the second edge forwarding element processes the data message flows of a second component of the application.

Conjunctively, or alternatively, the method of some embodiments deploys, for a tenant in a multi-tenant SDDC, a first edge forwarding element to process data message flows associated with the machines of the tenant that operate in the SDDC. The method then detects that these data message flows consume more than a threshold amount of bandwidth. Based on a policy that specifies allocation of additional bandwidth for data message flows associated with the tenant when its data message flows consume more than the threshold amount, the method determines that additional bandwidth needs to be allocated for the data message flows to and/or from the machines of the tenant in response to the detection, and then deploys, for the tenant, a second edge forwarding element to process at least a portion of its data message flows in order to allocate more bandwidth to the tenant's machines.

The deploying, detecting, and determining operations in some embodiments are performed by a set of one or more controllers. Also, in some embodiments, the SDDC is a datacenter that belongs to a multi-tenant public cloud operated by a public cloud provider that provides compute resources, network resources, and/or storage resources from multiple tenants. In other embodiments, the SDDC is a private datacenter of an entity (e.g., a corporation, school, organization, etc.), and the tenants are different sub-entities (e.g., divisions, departments, etc.) associated with the entity.

After the deployment of the second edge forwarding element for the tenant, the first edge forwarding element continues to process a first set of data message flows associated with the tenant, while the second edge forwarding element processes a second set of data message flows associated with the tenant. In some embodiments, the first set of data message flows are for a first set of machines of the tenant, while the second set of data message flows are for a second set of machines of the tenant. Both sets of data message flows (i.e., the first and second data message flows) are between machines in a first network that is defined in the SDDC for the tenant and machines external to the first network of the SDDC (i.e., are flows entering or exiting the first network).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings, but rather are to be defined by the appended claims, because the claimed subject matters can be embodied in other specific forms without departing from the spirit of the subject matters.

BRIEF DESCRIPTION OF FIGURES

The novel features of the invention are set forth in the appended claims. However, for purposes of explanation, several embodiments of the invention are set forth in the following figures.

FIG. 11 illustrates a set prefix window, while

DETAILED DESCRIPTION

Figure 1:
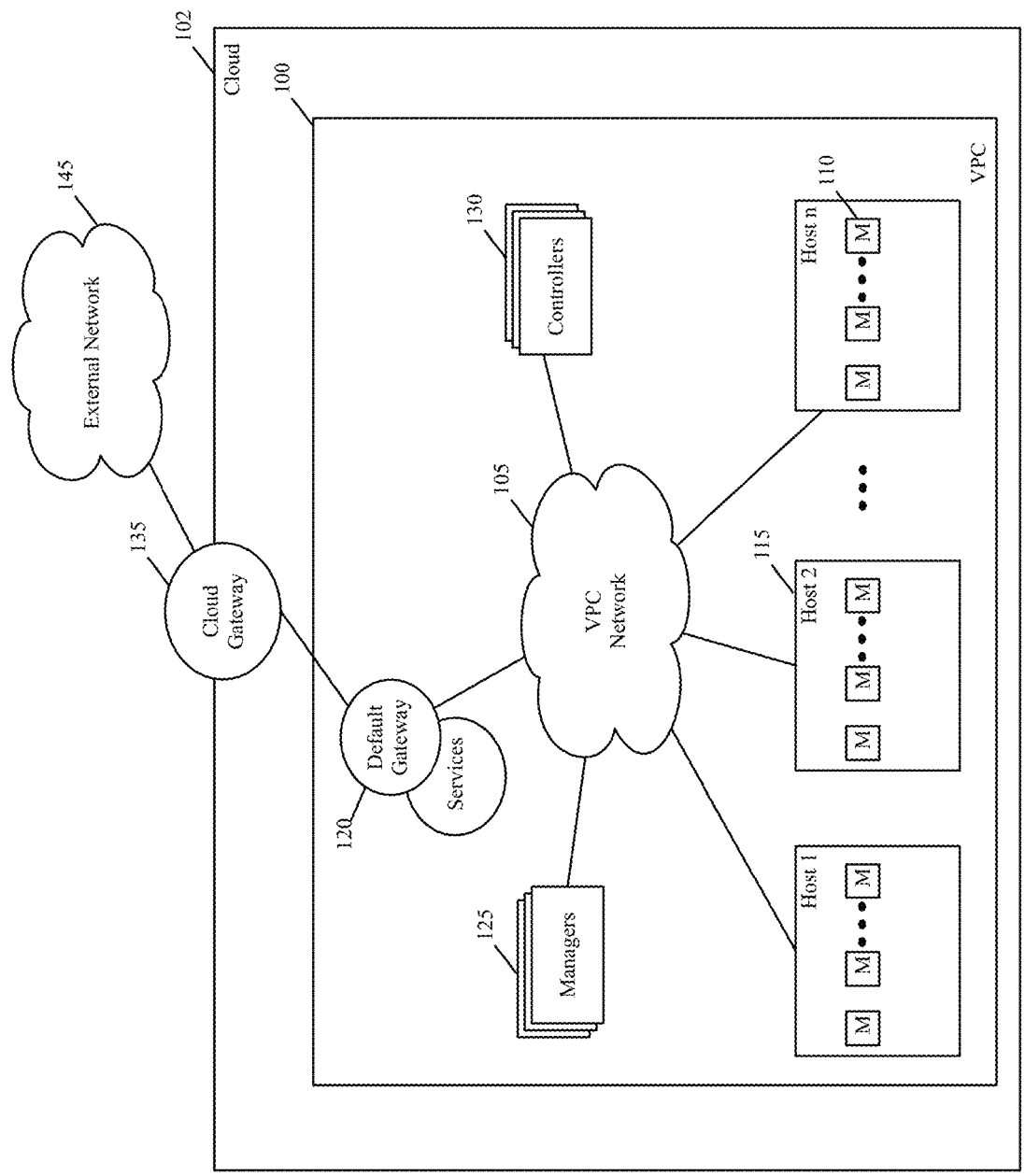
FIGS. 1-3 illustrate one example of deploying multiple edge gateways in an SDDC in order to allocate additional bandwidth to multiple different sets of ingress and egress flows to and from machines that are deployed in the SDDC for an entity.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for deploying edge forwarding elements in a public or private software defined datacenter (SDDC). For an entity (e.g., tenant, business, department, etc.), the method deploys a default first edge forwarding element to process data message flows between machines of the entity in a first network of the SDDC and machines external to the first network of the SDDC (e.g., machines outside of the SDDC). The method subsequently receives a request to allocate more bandwidth to a first set of the data message flows entering or exiting the first network of the SDDC.

In response, the method deploys a second edge forwarding element to process the first set of data message flows of the entity in order to allocate more bandwidth to the first set of the data message flows, while continuing to process a second set of data message flows of the entity through the default first edge node. The method of some embodiments provides a novel way of making bandwidth available as any other user-selectable resource (like compute machines, service machines, network elements, etc.) in the SDDC.

The method in some embodiments receives the request for more bandwidth by first receiving a request to create a traffic group and then receiving a list of network addresses that are associated with the traffic group. The list of network addresses identifies the subset of the data message flows to be processed by the second edge node. The network addresses in some embodiments are network addresses associated with interfaces for connecting the machines in the first network to forwarding elements of the first network. In some embodiments, the method receives the list of network addresses associated with the traffic group by receiving a prefix of network addresses and then receiving a request to associate the prefix of network addresses with the traffic group. Based on this request, the method then creates an association between the traffic group and the received prefix of network addresses.

In some embodiments, the method deploys the second edge forwarding element by configuring the second edge forwarding element to forward data messages of the first set to forwarding elements in the external network, and configuring a set of forwarding elements in the first network to forward the first set of data message flows from a set of machines of the first network to the second edge forwarding element. The edge forwarding elements in some embodiments are edge routers. The method in some of these embodiments configures the second edge forwarding element by configuring the second edge forwarding element to advertise to forwarding elements in the external network routes to the set of machines.

After receiving the request to allocate more bandwidth to the first set of data message flows, the method of some embodiments receives a request to allocate more bandwidth to a third set of the data message flows of the entity that enter or exit the first network of the SDDC. The method deploys for the entity a third edge forwarding element to process the third set of data message flows in order to allocate more bandwidth to the third set of the data message flows, while continuing to process the second set of data message flows through the default first edge node and to process the first set of data message flows through the second edge node.

Like the request for allocating more bandwidth for the first set of data message flows, the method in some embodiments receives the request for more bandwidth for the third set of data message flows by first receiving a request to create another traffic group, receiving another prefix of network addresses that identify the third set of data message flows, and then receiving a request to associate the newly received traffic group with the newly received address prefix. In some embodiments, the address prefixes for the first and third data message flows can overlap. In such cases, the method resolves the overlap by assigning the overlapping addresses to the traffic group that more specifically identifies the addresses.

For instance, if the first list of addresses for the first data message flow set is specified in terms of a range of IP addresses (192.168.200.0/24) while the second list of addresses for the third data message flow set specifies a specific address (192.168.200.10) in this range, the method assigns the more specific address to the second traffic group that identifies the third data message flow set. Alternatively, the first list of addresses can be specified in terms of a first range of IP addresses (192.168.200.0/24) and the second list of addresses can be specified as a smaller second range of IP addresses (192.168.200.0/32) within the first range. In such a case, the method assigns the more specific addresses (i.e., the smaller range 192.168.200.0/32) to the second traffic group that identifies the third data message flow set and the remaining IP addresses in the larger range (the remaining addresses in 192.168.200.0/24) to the first traffic group.

In some embodiments, the method deploys the second and third edge forwarding elements by deploying the second and third edge forwarding elements as different forwarding appliances, while in other embodiments it deploys these forwarding elements by deploying different machines that execute on different host computers in the SDDC. Using different host computers for different sets of data message flows allows different resources (e.g., different physical network interface cards (PNICs)) of the different host computers to be used for the different sets of data message flows.

As used in this document, data messages refer to a collection of bits in a particular format sent across a network. One of ordinary skill in the art will recognize that the term data message is used in this document to refer to various formatted collections of bits that are sent across a network. The formatting of these bits can be specified by standardized protocols or non-standardized protocols. Examples of data messages following standardized protocols include Ethernet frames, IP packets, TCP segments, UDP datagrams, etc. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model.

Figure 2:
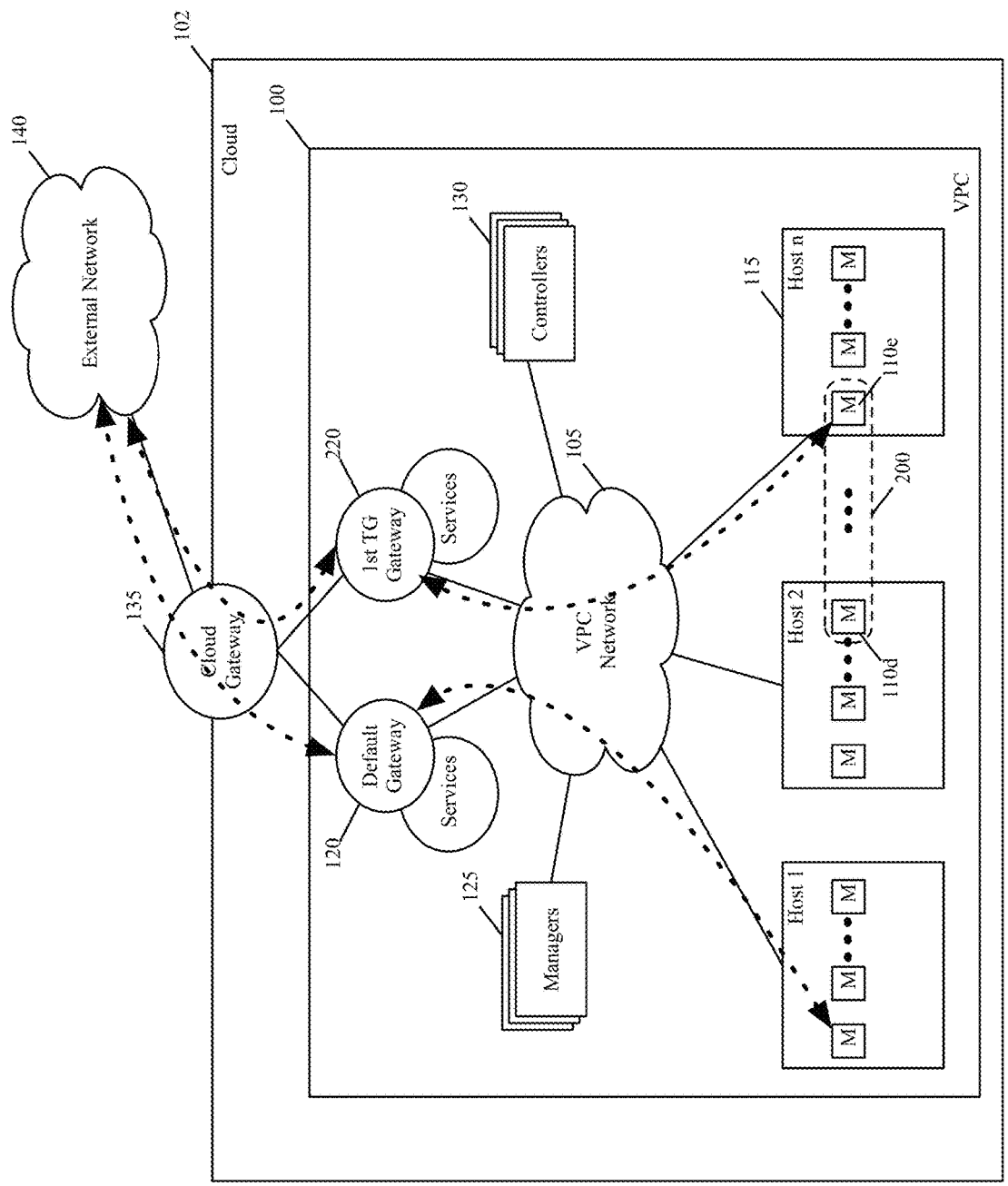
Figure 3:
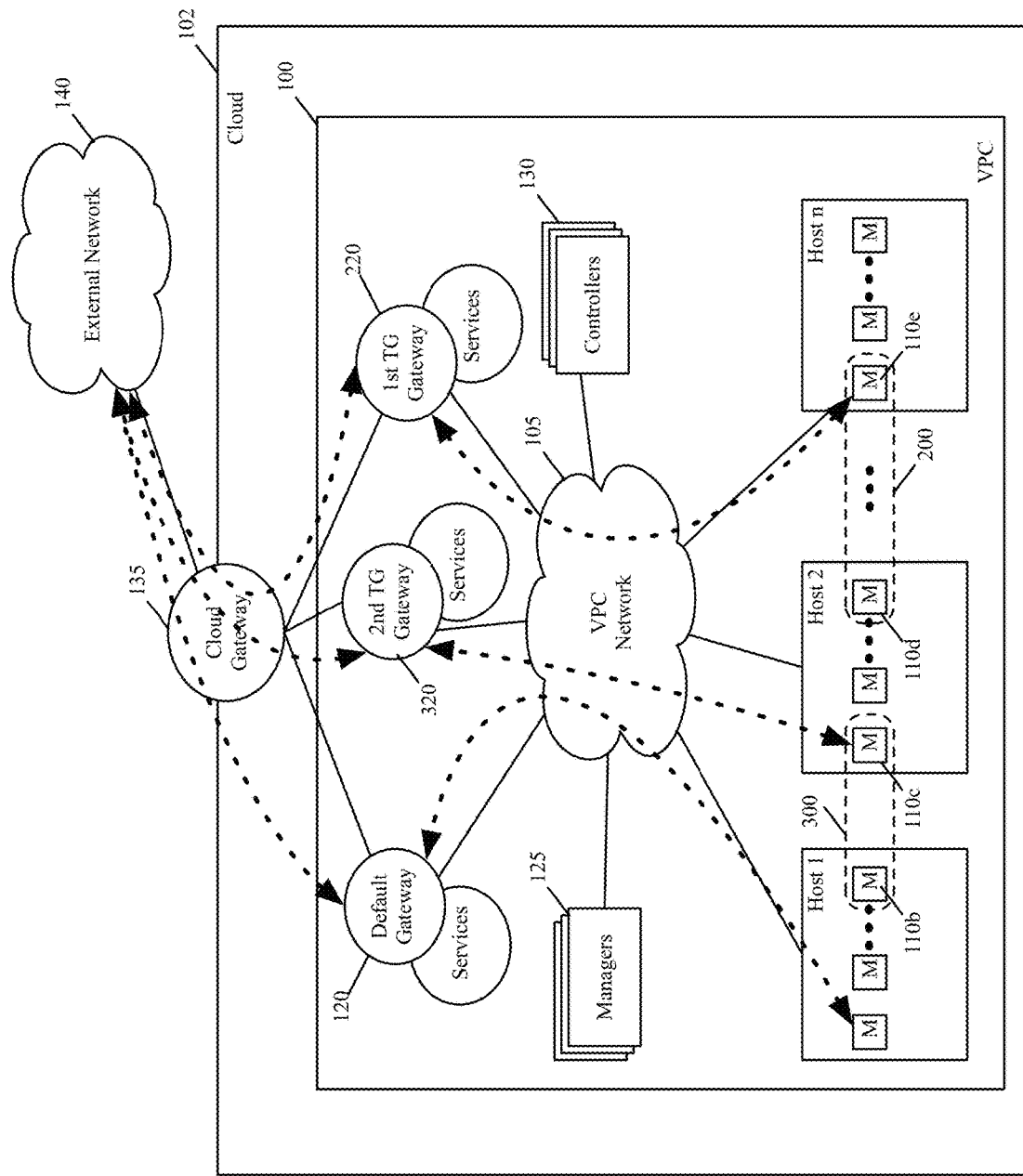

The edge forwarding elements in some embodiments are edge gateways that connect the private first network of the entity to external networks (e.g., to the network of the SDDC or to external networks outside of the SDDC). FIGS. 1-3 illustrate one example of deploying multiple edge gateways in an SDDC in order to allocate additional bandwidth to multiple different sets of ingress and egress flows to and from machines that are deployed in the SDDC for an entity. In this example, the SDDC is a public cloud availability zone 102 in which a virtual private cloud (VPC) 100 has been defined for an entity, which in this example is a tenant of the private cloud. An availability zone in some embodiments includes one datacenter or more than one datacenters that are near each other. Although FIGS. 1-3 illustrate the use of some embodiments in a public cloud context, one of ordinary skill will realize that some embodiments of the invention can similarly be implemented in private datacenters.

For the entity, the VPC 100 includes a private network 105 formed by several forwarding elements (e.g., switches and routers), which are not shown in these figures to avoid obscuring these figures with unnecessary detail. The forwarding elements include software forwarding elements (e.g., software switches and/or routers) and middlebox elements (e.g., firewall, load balancers, etc.) executing on multi-tenant host computers 115 along with machines 110 that have been deployed for the entity. In some embodiments, the forwarding elements also include hardware forwarding elements and/or middlebox elements (e.g., hardware switching and/or router appliances, and/or middlebox appliances).

In some embodiments, the private network 105 is established by sharding the internal network address space of the private cloud, and providing a set of internal network addresses to the private network 105 that does not overlap with the internal network addresses provided to any other tenant of the VPC. In other embodiments, the private network 105 is a logical overlay network that is formed by establishing tunnels between the forwarding elements of the private network and having the forwarding elements exchange data messages through these tunnels, e.g., by encapsulating the data messages with tunnel headers that allow the data messages to be exchanged between the forwarding elements, while preserving the original data message headers that contain network addresses defined in the logical address space. In some embodiments, the logical address space of one tenant might overlap with the logical address space of another tenant but this does not matter because of the encapsulating tunnel headers.

FIG. 1 illustrates a default gateway 120 that is initially deployed by a set of controllers 130 to connect the VPC network 105 with a first external network. The first external network in this example is a network inside of the public cloud datacenter 102. In this example, any VPC gateway (including the default gateway 120) connects to (i.e., forwards packets to) one or more gateways 135 of the public cloud datacenter 102, which communicates with an external network 145 outside of the public cloud datacenter 102. In other embodiments, a VPC gateway (including the default gateway 120) connects directly to the external network 145 without having to go through any gateway 135 of the public cloud datacenter 102.

In some embodiments, the controller set 130 configures the default gateway 120 to forward ingress data messages to the VPC network from the cloud gateway 135, and egress data messages from the VPC network to the cloud gateway 135. The controller set in some embodiments also configures the forwarding elements in the VPC network 105 to forward the egress data message to the default gateway 120, and the ingress data messages to the machines 110 of the VPC network.

FIG. 2 illustrates the VPC 100 after a gateway 220 has been created for a first traffic group (TG). This traffic group includes a set of machines 200, including machines 110d and 110e. The machine set 200 in some embodiments includes a group of machines for which an administrator of the entity has requested more bandwidth. In some embodiments, the administrator requests this extra bandwidth by first creating the traffic group in a management portal provided by a set of manager servers 125, and then providing a list of network addresses that are associated with the traffic group.

In some embodiments, the list of network addresses are network addresses associated with interfaces for connecting the machines in the machine set 200 to forwarding elements in the VPC network 105. In some embodiments, the administrator provides the list of network addresses associated with the traffic group by first providing a prefix of network addresses and then requesting that this prefix of network addresses be associated with the traffic group. Based on this request, the manager servers 125 direct the controller servers 130 to create an association between the traffic group and the received prefix of network addresses.

The administrator provided list of network addresses for the first TG identifies the subset of the data message flows to be processed by the first traffic group's gateway 220. Specifically, for the first traffic group, the controller set 130 deploys the first TG gateway 220. In some embodiments, it is important for the same TG gateway to process ingress and egress data messages flow for the traffic group machines, as the gateway needs to maintain state and/or performs stateful middlebox services (such as firewall, load balancing, etc.) for the traffic group. In some embodiments, each gateway (e.g., the default gateway, and each TG gateway) maintains state and/or preforms stateful middlebox services on ingress and/or egress traffic entering and/or exiting the VPC network.

In some of these embodiments, the controller set employs destination-side routing to ensure that the cloud gateway 135 forwards all of the ingress data messages to the first traffic group (i.e., all the data messages that are destined to the list of network addresses provided for the first traffic group) to the TG gateway 220, and source-side routing to ensure that the forwarding elements of the VPC network 105 forward all the egress data messages from the first traffic group (i.e., all the egress data messages from the list of network addresses provided by the first traffic group) to the TG gateway 220.

More specifically, the controller set 130 configures the cloud gateway 135 to forward to the first TG gateway 220 ingress data messages that are destined to the network address provided for the first traffic group. The controller set 130 also configures the first TG gateway 220 to forward these ingress data messages to the VPC network 105 from the cloud gateway 135, and egress data messages from the first TG machines 200 to the cloud gateway 135. In some embodiments, the controller servers also configure the first TG gateway 220 to advertise routes to the list of TG-associated network addresses to the cloud gateway 135. The controller set 130 in some embodiments also configures the forwarding elements in the VPC network 105 to forward the egress data message with source addresses in the provided list of address of the first traffic group (i.e., all the egress data messages from the set of machines 200 of the first traffic group) to the first TG gateway 220. It also configures these forwarding elements to forward the ingress data messages that are destined to the TG-associated network addresses to the machine set 200.

The forwarding elements in the VPC network 105 in some embodiments include intervening routers. The controller set 130 configures these intervening routers in the VPC network 105 in some embodiments by providing next-hop forwarding rules to the set of intervening routers. Alternatively, or conjunctively, the configured set of forwarding elements in some embodiments includes a set of intervening switches that implement a logical switch. In these embodiments, the method configures the set of intervening switches by providing forwarding rules to the set of intervening switches to direct the switches to forward the first set of data message flows to the first TG gateway 220 through tunnels that connect the set of intervening switches to the first TG gateway 220.

FIG. 3 illustrates the VPC 100 after a gateway 320 has been created for a second traffic group (TG). This traffic group includes a set of machines 300, including machines 110b and 110c. The machine set 300 in some embodiments includes a group of machines for which the entity administrator has requested more bandwidth. In some embodiments, the administrator requests this extra bandwidth by first creating the second traffic group in the management portal, and then providing a list of network addresses that are associated with the second traffic group. The provided list of addresses in some embodiments are network addresses associated with interfaces for connecting the machines in the machine set 300 to forwarding elements in the VPC network 105. Like the addresses for the first traffic group, the administrator in some embodiments provides the network addresses for the second traffic group by first providing a prefix of network addresses and then requesting that this prefix of network addresses be associated with the second traffic group. Based on this request, the manager set 125 directs the controller set 130 to create an association between the second traffic group and the prefix of network addresses received for this group.

For the second traffic group, the controller set 130 deploys the second TG gateway 320. As it did for the first traffic group, the controller set employs destination-side routing to ensure that the cloud gateway 135 forwards all of the ingress data messages to the second traffic group (i.e., all the data messages that are destined to the list of network addresses provided for the second traffic group) to the second TG gateway 320, and source-side routing to ensure that the forwarding elements of the VPC network 105 forward all the egress data messages from the second traffic group (i.e., all the egress data messages from the list of network addresses provided by the second traffic group) to the second TG gateway 320.

The controller set 130 also configures the second TG gateway 320 to forward the ingress data messages to the VPC network 105 from the cloud gateway 135, and egress data messages from the second TG machines 300 to the cloud gateway 135. In some embodiments, the controller set also configures the second TG gateway 320 to advertise routes to the network addresses associated with the second traffic group to the cloud gateway 135. The controller set 130 in some embodiments also configures the forwarding elements in the VPC network 105 to forward ingress data messages that are destined to the second TG-associated network addresses to the machine set 300.

After the controller set 130 configures the first TG and second TG gateways 220 and 320, the first gateway 220 forwards all of the ingress and egress traffic for the first traffic group machines, the second gateway 320 forwards all of the ingress and egress traffic for the second traffic group machines, and the default gateway 120 forwards all of the ingress and egress traffic for entity machines that are not in the first and second traffic groups.

In some embodiments, each gateway 120, 220 or 320 is logical gateway that implemented by a high-availability (HA) pair of physical gateways, which are in an HA active-standby configuration, as further described below. Also, each gateway is deployed as a separate appliance in some embodiments. In other embodiments, each gateway is deployed as a machine that executes on a host computer (e.g., a multi-tenant host computer or a standalone host computer). In some of these embodiments, the different gateways are deployed on different host computers in order to maximize the throughput of each gateway. Using different host computers to implement different gateway for different traffic groups allows dedicated resources (e.g., physical network interface cards (PNICs)) of the different host computers to be used for the data message flows of the different traffic groups.

Figure 4:
FIG. 4 conceptually illustrates a process performed by the manager and controller servers in some embodiments to define and deploy a traffic group to allocate additional bandwidth to a set of machines.

FIG. 4 conceptually illustrates a process 400 performed by the manager and controller servers 125 and 130 in some embodiments to define and deploy a traffic group to allocate additional bandwidth to a set of machines. This process will be explained by reference to FIGS. 5-18, which illustrate an administrator's interaction with a management user interface (UI) 500 to create and define the traffic group. The management servers 125 in some embodiments provide this UI and process the administrator requests that are made through this UI.

Figure 5:
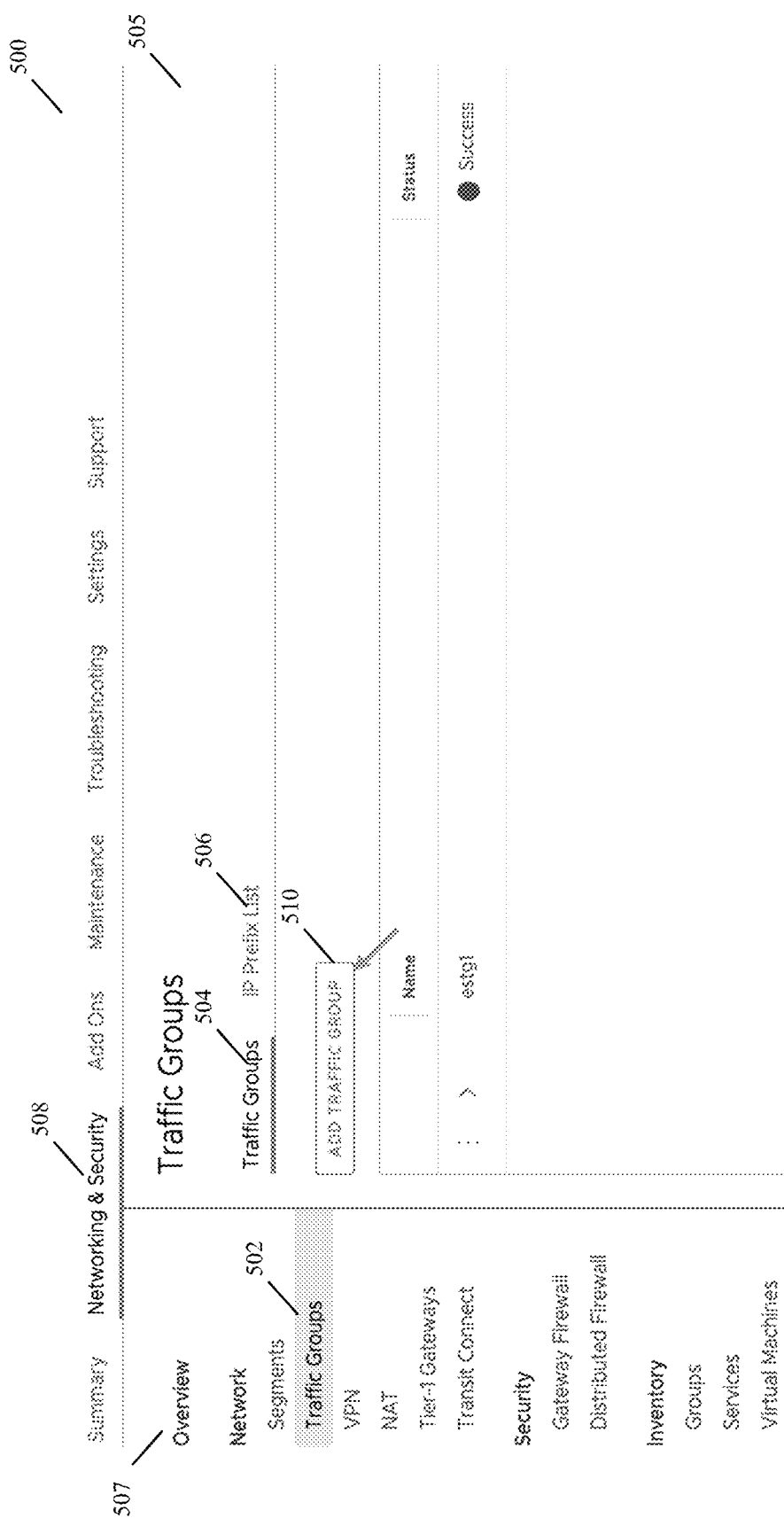
FIG. 5 illustrates an example of a management user interface of some embodiments for defining and creating traffic groups.

As shown, the process 400 starts the management UI 500 (at 405) receives administrator's request to create the traffic group and creates a traffic group (e.g., created a traffic group object) in response to this request. FIG. 5 illustrates an example the management UI 500. Specifically, it illustrates a traffic group pane 505 that is displayed when the administrator (i.e., the user) selects the traffic group control 502 in the side panel 507 that lists the network and security controls 508. The traffic pane 505 includes two tabs, the traffic groups pane 504 and IP prefix list pane 506. In FIG. 5, the traffic groups pane 504 is being shown with one previously created traffic group estg1, and the user is selecting the add traffic group control 510 through a cursor click operation, as shown.

Figure 6:
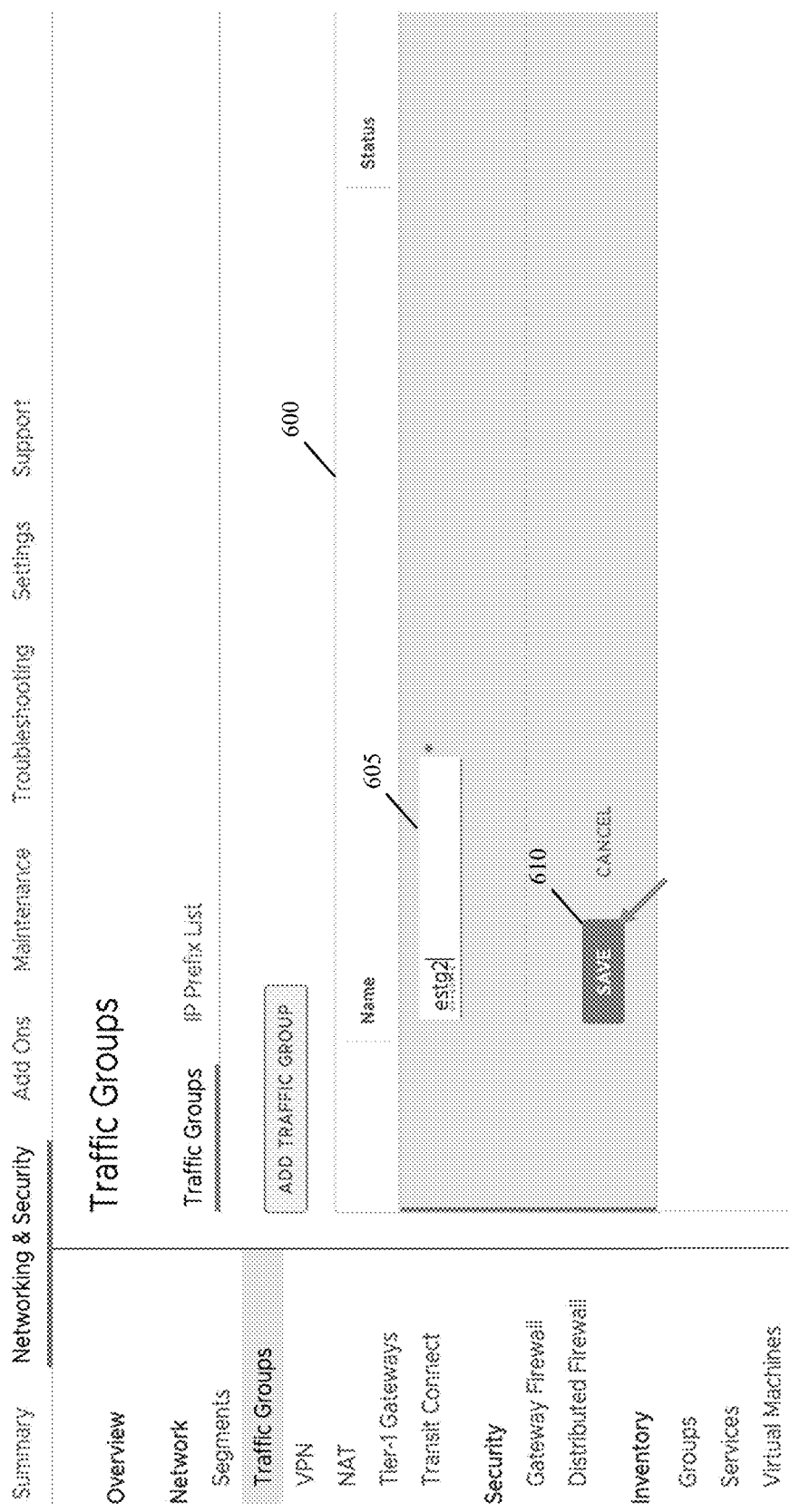
FIG. 6 illustrates a display window that is displayed following a selection of a traffic group control.
Figure 7:
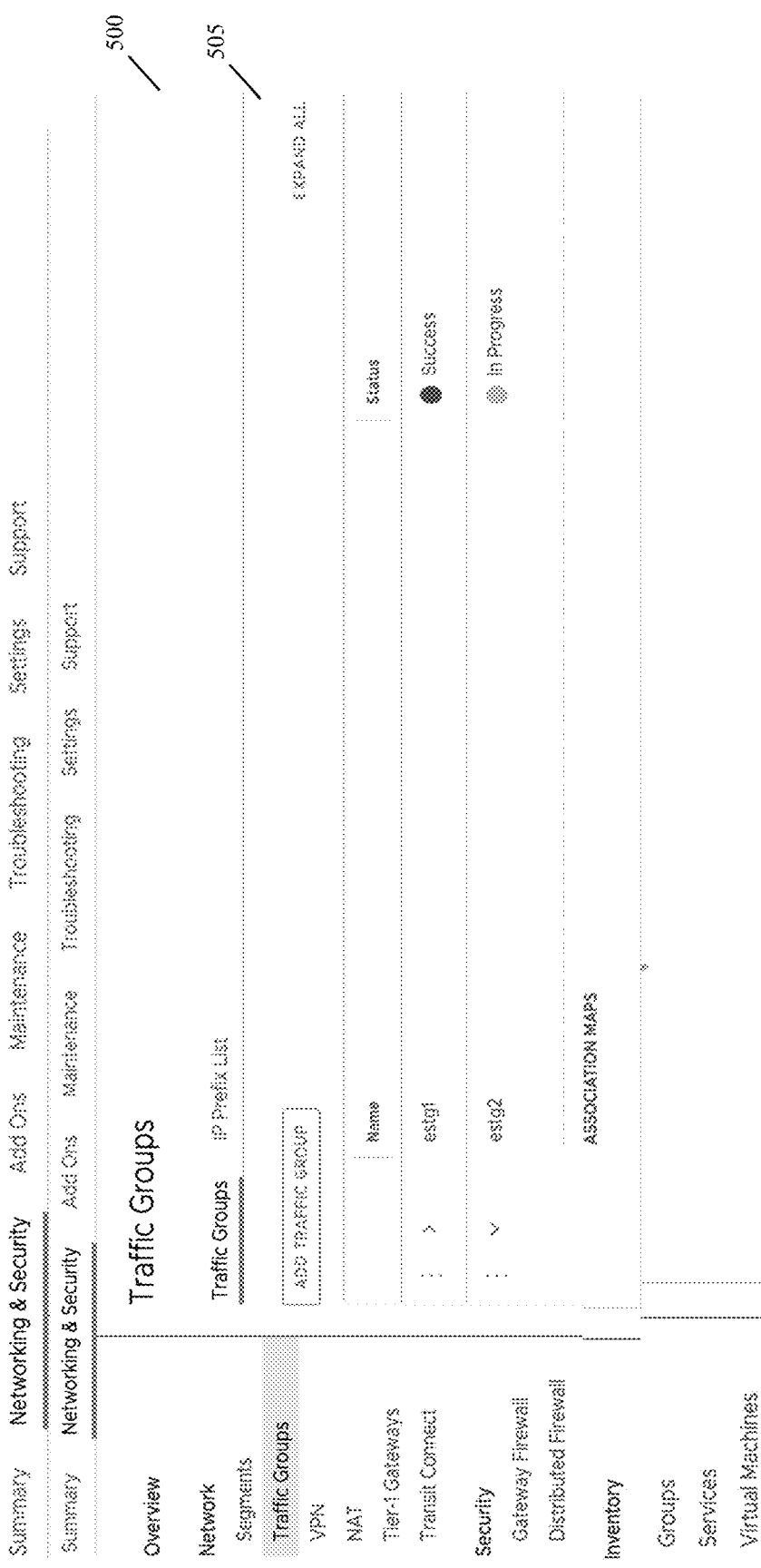
FIG. 7 illustrates the addition of a newly created traffic group to the traffic groups listed in a traffic group pane.

FIG. 6 illustrates a display window 600 that is displayed following the selection of the add traffic group control 510 by the management servers 125. It also illustrates the user providing a name (estg2) for this traffic group in the name field 605, and saving this newly created traffic group by selecting the save control 610 through a cursor click operation. FIG. 7 illustrates the addition of this newly created traffic group estg2 to the traffic groups that are listed on the traffic group pane 505.

After creating (at 405) the traffic group, the process 400 receives from the user a list of network addresses that will subsequently be associated with the traffic group. In some embodiments, a user can provide the list of addresses before the creation of the traffic group with which they will later be associated. The process 400 stores the received list of network addresses as an IP prefix list.

Figure 8:
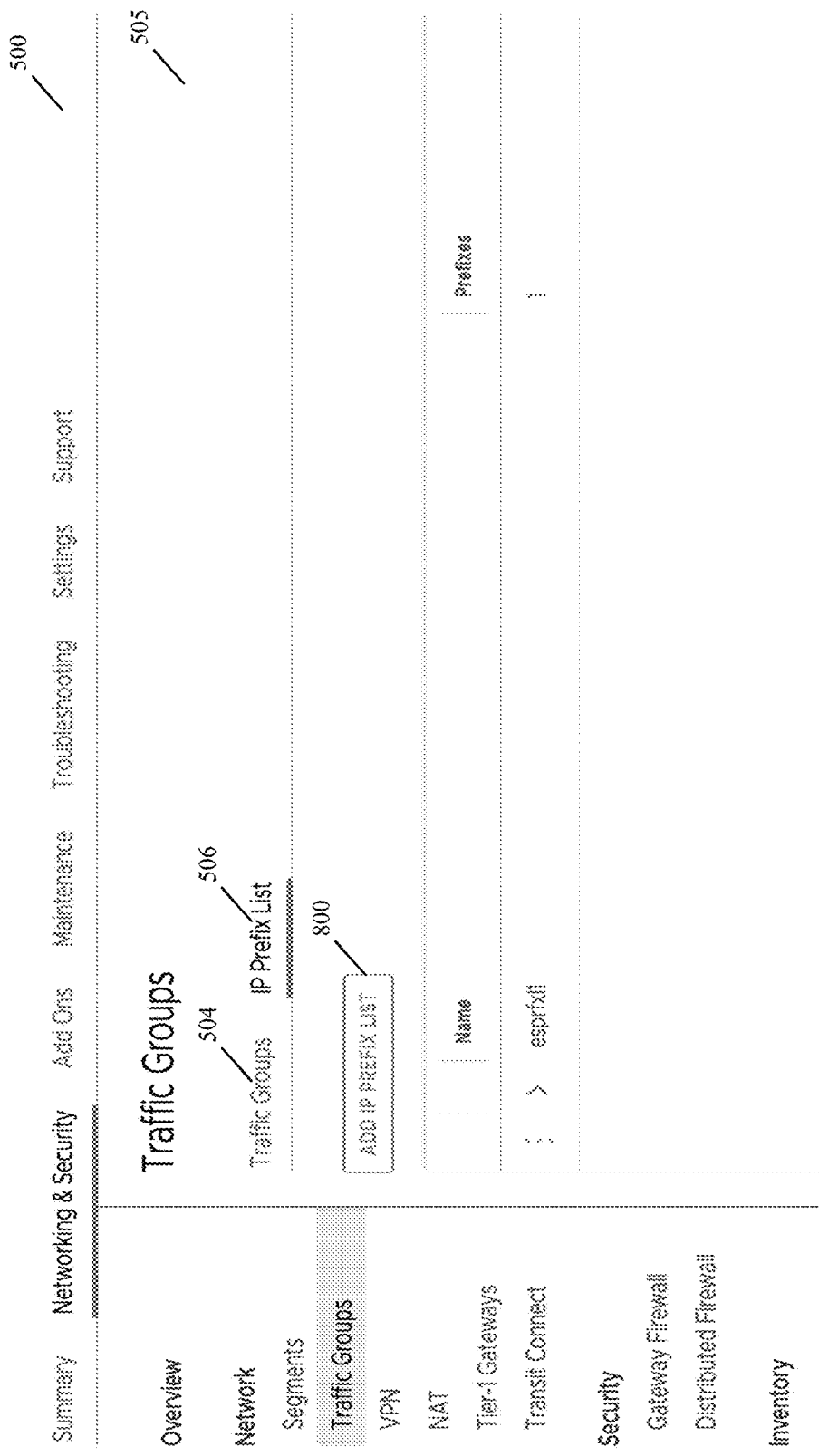
FIG. 8 shows a IP prefix list pane that includes an add IP prefix list control.
Figure 9:
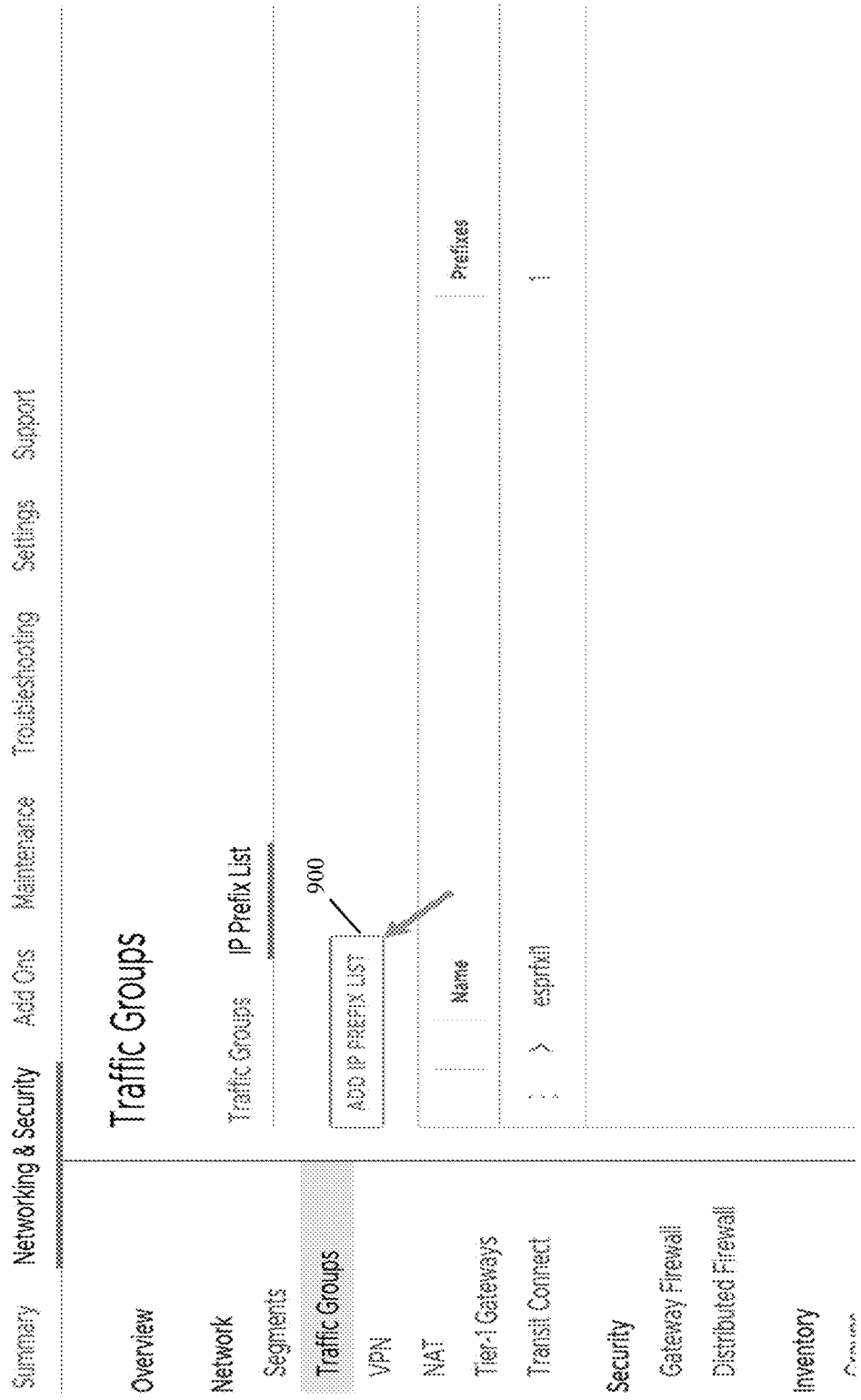
FIG. 9 shows the selection of the prefix list control.
Figure 10:
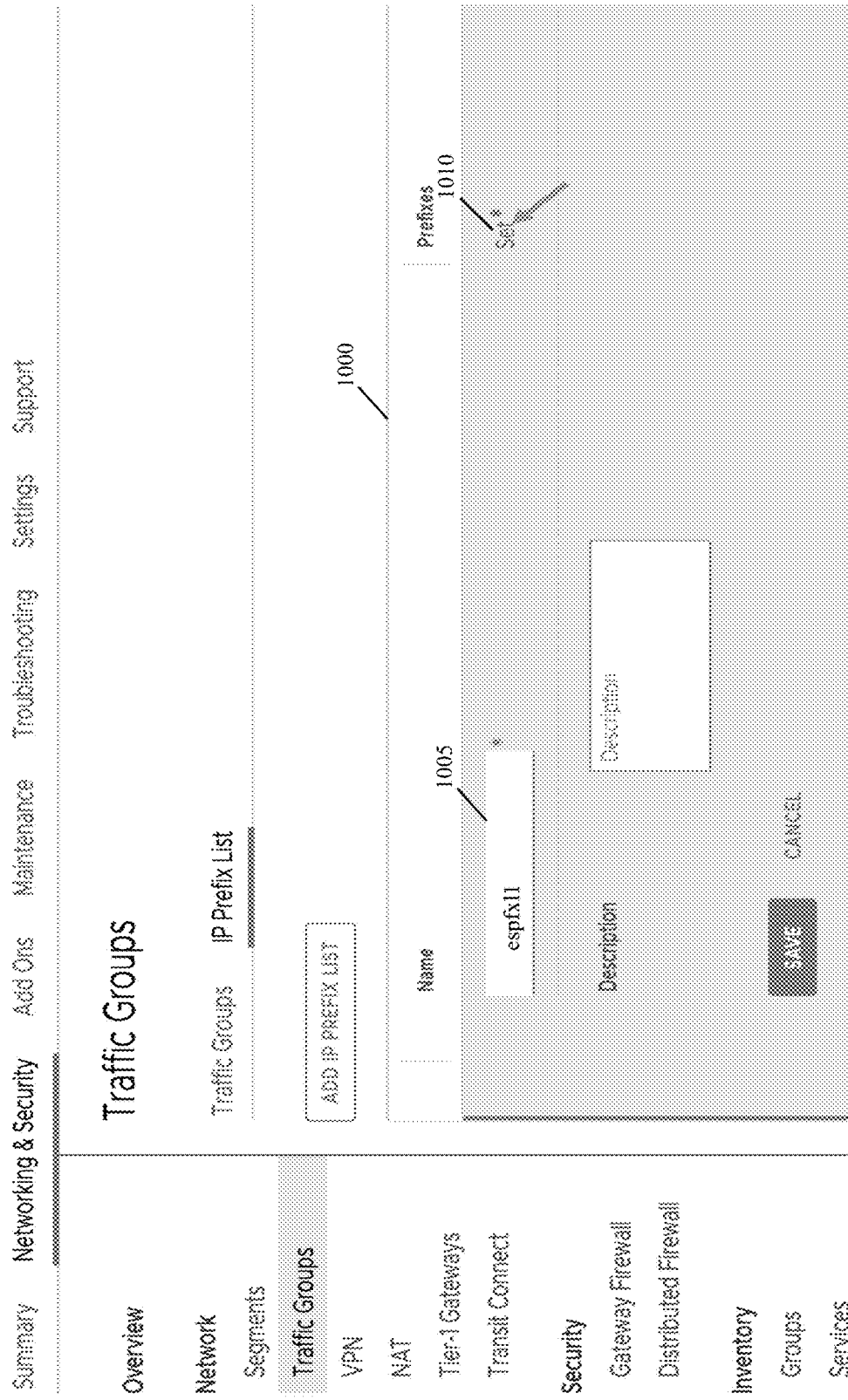
FIG. 10 illustrates a display window that is presented after selection of the prefix list control.
Figure 11:
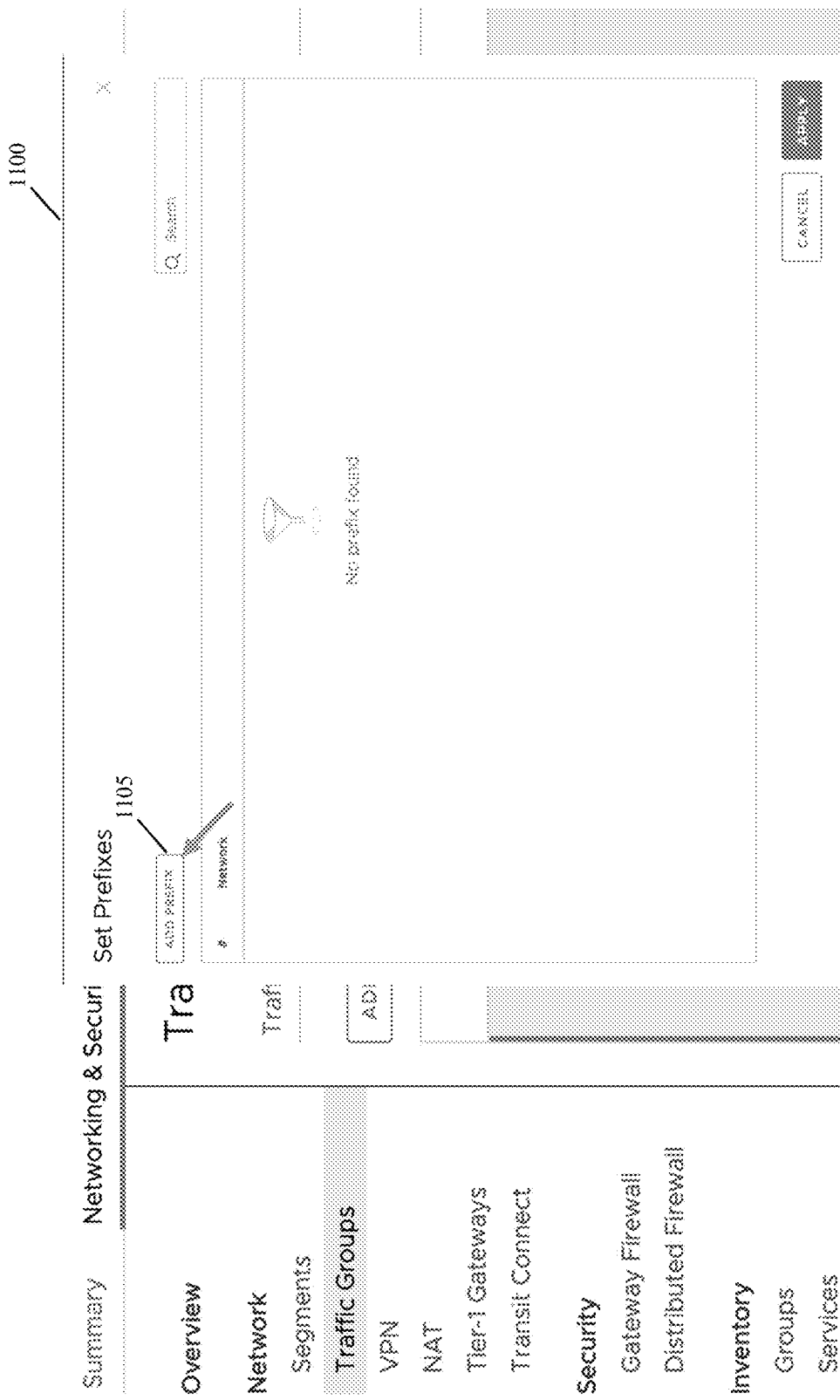

FIGS. 8-14 illustrate an administrator's interaction with the management UI 500 to create and define an IP prefix list. FIG. 8 shows the IP prefix list pane 506 that includes an add IP prefix list control 800, while FIG. 9 shows the selection of this control 900 through a cursor click operation. FIG. 10 illustrates a display window 1000 that is presented after this selection. It also displays that in a prefix name field 1005, the user has specified a prefix name (espfxl1). It further displays the user's selection of a set control 1010, which results in the opening of a set prefix window 1100 illustrated in FIG. 11.

Figure 12:
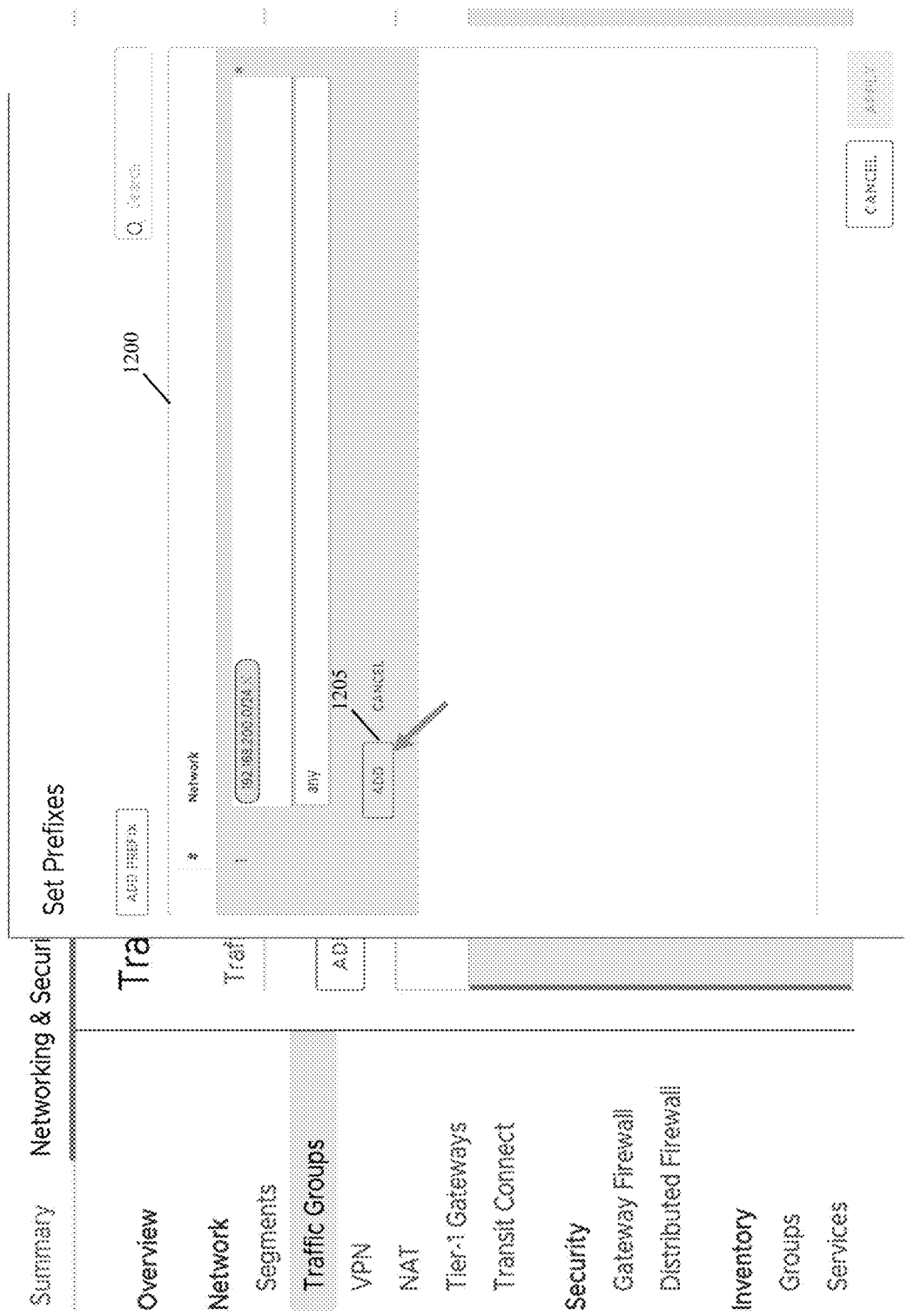
FIG. 12 illustrates a prefix pane.
Figure 13:
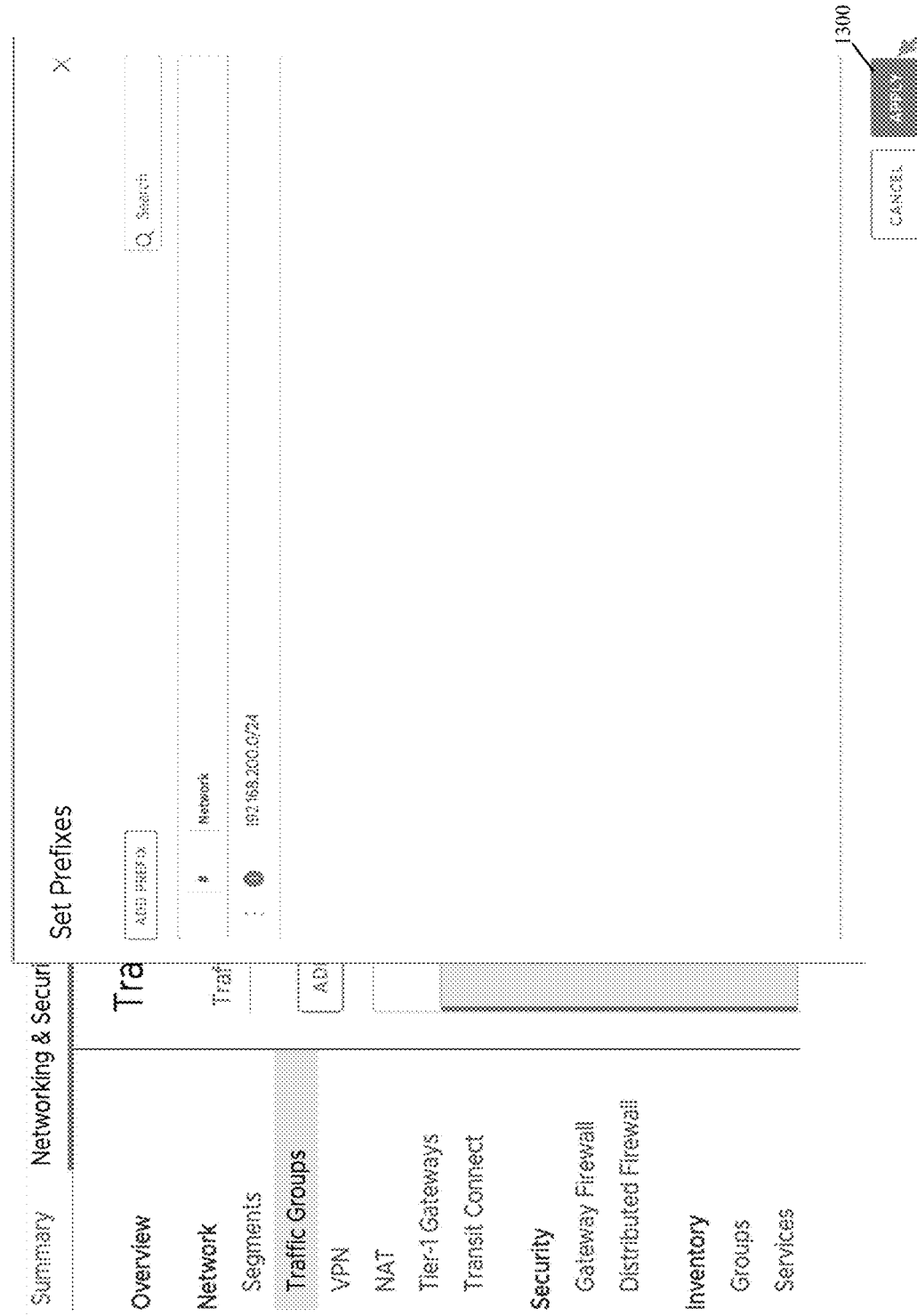
FIG. 13 illustrates the set prefix window that displays the specified prefix along with the user's selection of the apply control to direct the management servers to associate the specified prefix list with the prefix name.
Figure 14:
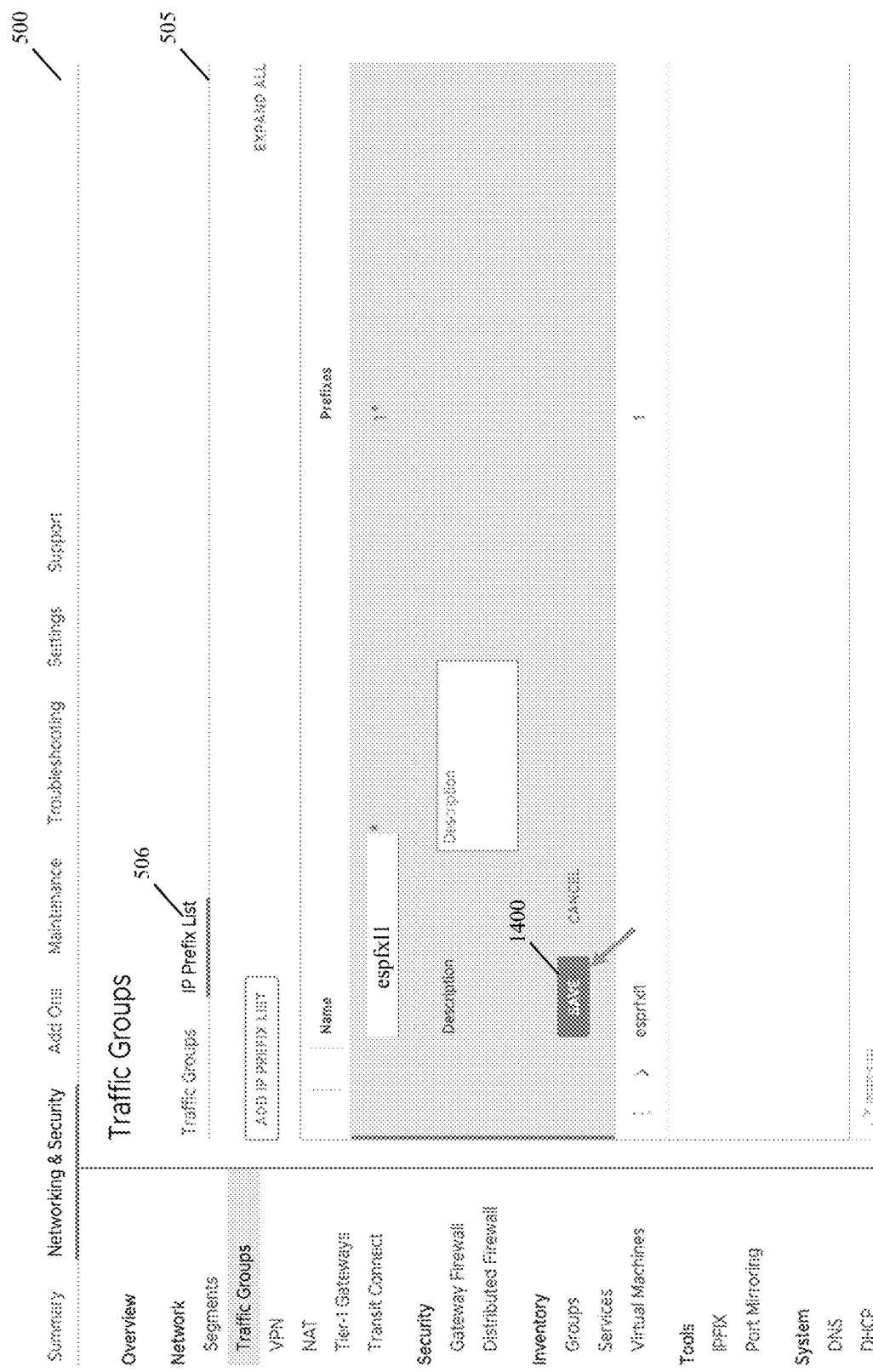
FIG. 14 illustrates the prefix pane after the selection of the apply control.

In the set prefix window 1100 the user selects an add prefix control 1105, which directs the UI 500 to display a prefix pane 1200 illustrated in FIG. 12. In this pane 1200, the user specifies one or more IP prefixes. In this example, one IP prefix (192.168.200.0/24) has been specified. After specifying the IP prefix, the user selects an add control 1205, which then causes the set prefix window 1100 to display the specified prefix. This display is shown in FIG. 13, along with the user's selection of the apply control 1300 to direct the management servers to associate the specified prefix list with the prefix name. FIG. 14 illustrates the prefix pane 506, which after the selection of the apply control 1300 in FIG. 13 now displays "1" for the prefixes that have been defined for the prefix name espfxl1. FIG. 14 also shows the user's selection of a save control 1400 that directs the management servers to save the specified prefix list espfxl1, which includes its name and its specified set of IP prefixes.

Figure 15:
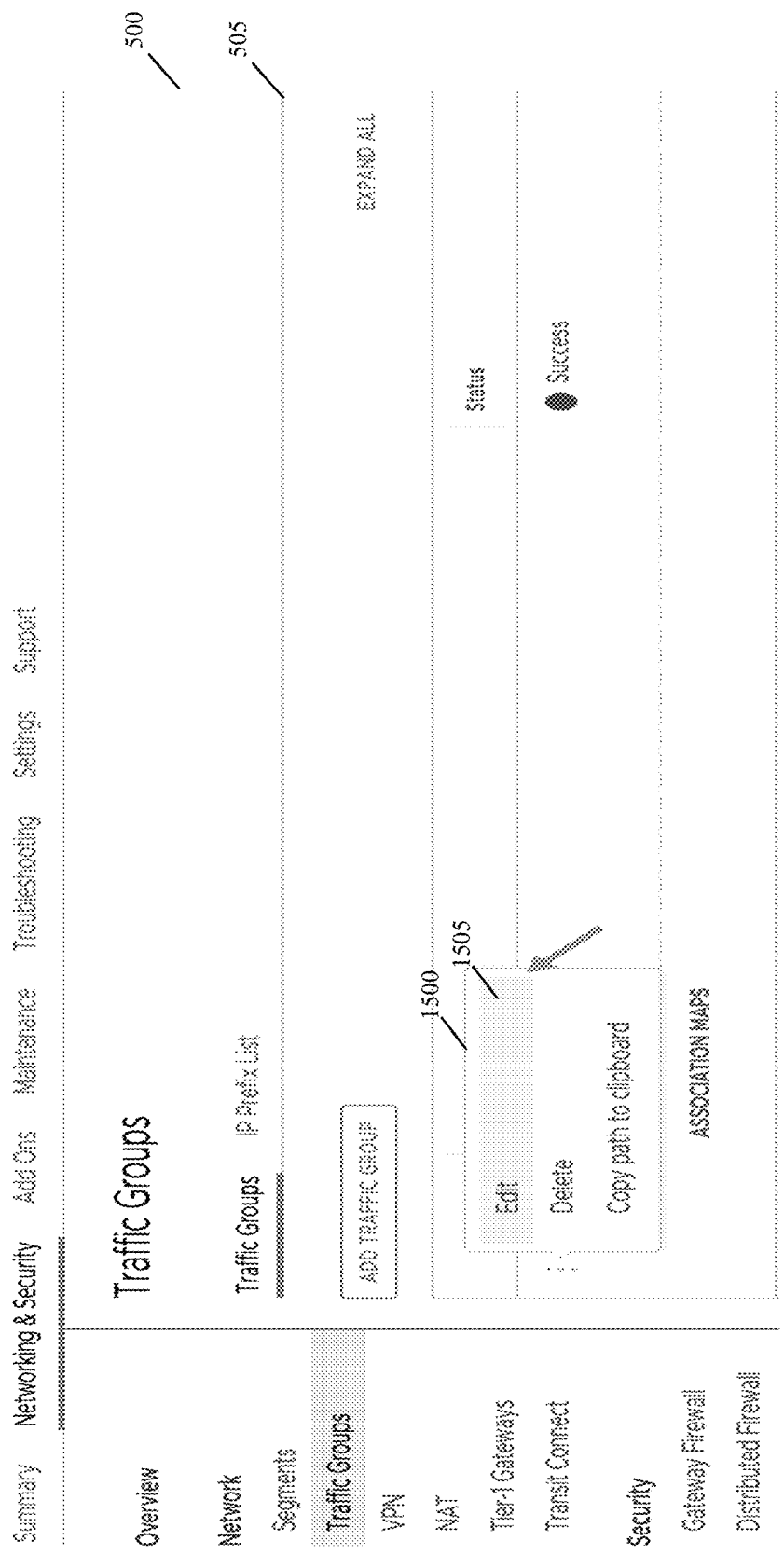
FIGS. 15-18 illustrate the association of a received list of network addresses with a traffic group.

After receiving (at 410) from the user a list of network addresses, the process 400 receives a request from the user to associate the received list of network addresses with the traffic group specified at 405. FIGS. 15-18 illustrate an example of this association request for some embodiments. FIG. 15 illustrates the user's invocation of a set of controls 1500 for the specified traffic group. In some embodiments, the user invokes this control set 1500 through a cursor (e.g., a right hand click) operation or a keyboard operation with respect to the traffic group name (estg2) that is displayed in the traffic group pane 505.

FIG. 15 also illustrates the user's selection of an edit control 1505 in the control set 1500. This selection results in the display of a mapping window 1600 of FIG. 16. As shown, the mapping window has an add-mapping control 1605 that allows the user to specify one or more IP prefix mappings to a traffic group (e.g., estg1). Each mapping has a name that can be entered through the name field 1610, a gateway name that can be entered through the gateway field 1620, and a mapped IP prefix that can be entered through the prefix drop-down list 1615. To map the traffic group to multiple IP prefixes, the add-mapping control 1605 in some embodiments has to be invoked multiple times, once for each mapping.

Figure 16:
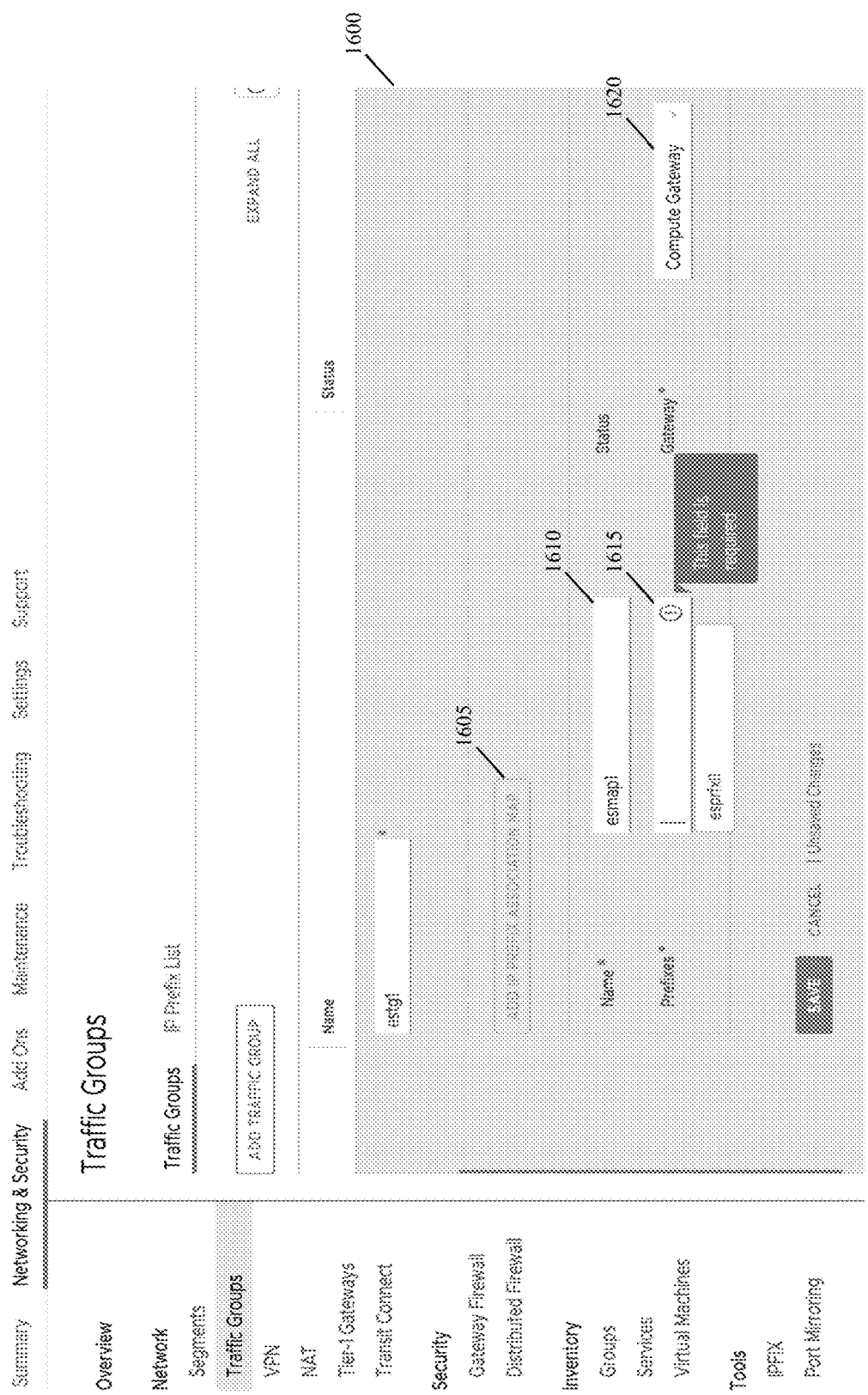
Figure 17:
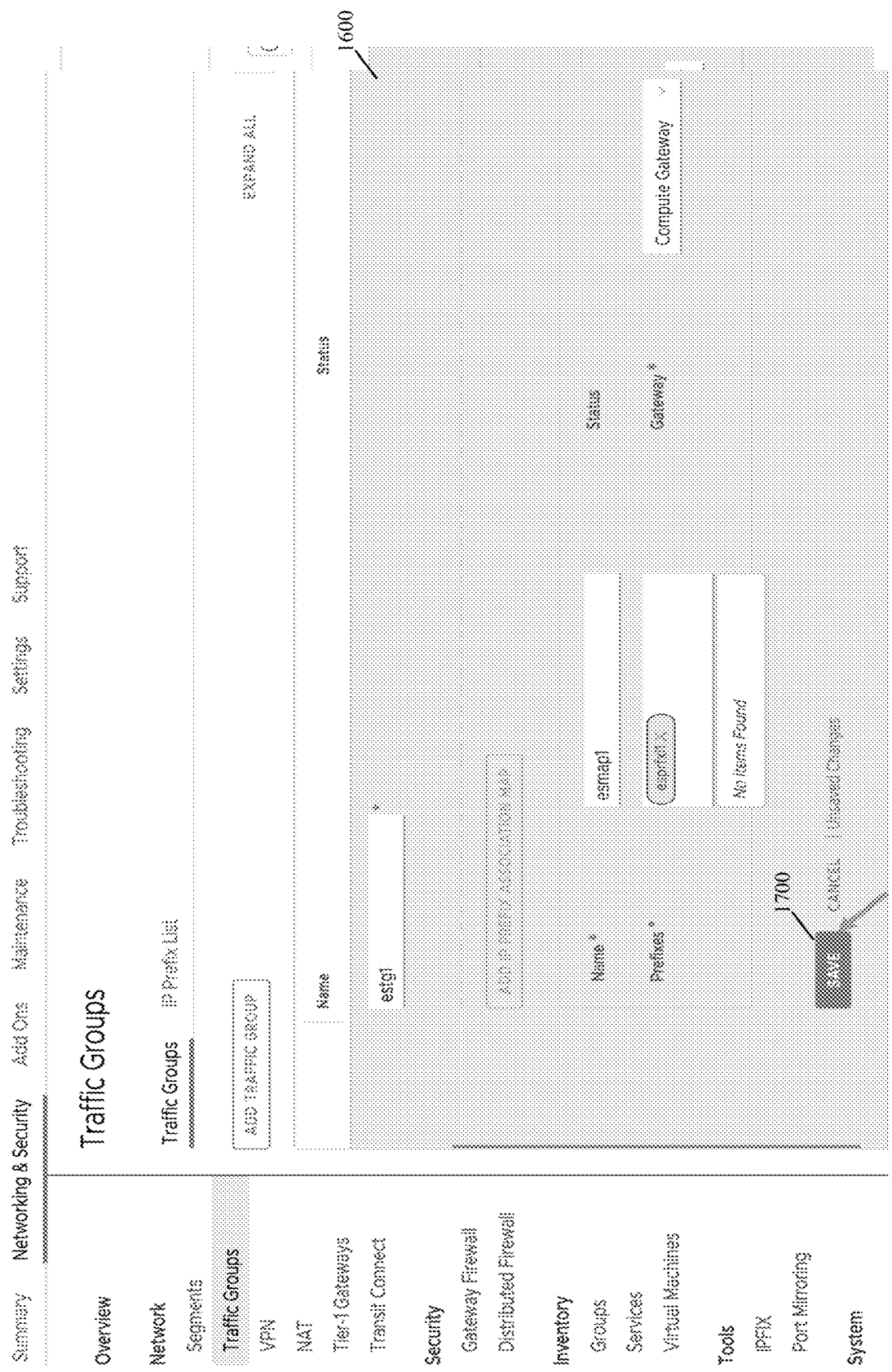
Figure 18:

FIG. 16 shows the mapping of the traffic group estg1 to the prefix list esprfxl1. It also shows that the name for this mapping is esmap1 and the name of the gateway is compute gateway. This name is indicative of the machines that are associated with the specified IP prefix esprfxl1 in this example. FIG. 17 illustrates the selection of a save control 1700 of the mapping window 1600 after the various values have been specified in the mapping window for the traffic group estg1. FIG. 18 then illustrates traffic group pane 505 after this save operation. As shown, the traffic group pane 505 displays the attributes of the estg1, which now include the mapping esmap1 to the IP prefix esprfxl1.

Once the specified traffic group is associated with a specified list of network addresses, the management servers 125 direct (at 420) the controller servers to deploy a gateway for the traffic group and to configure the SDDC routers to forward data message traffic for the traffic group's associated IP prefix through this gateway. The controller servers 130 in some embodiments deploy (at 425) the TG gateway as an HA pair of physical gateways, with one physical gateway serving as the active gateway and the other physical gateway serving as a standby gateway. In some embodiments, each physical gateway is deployed as a machine (e.g., virtual machine) executing on a host computer in the SDDC, and the gateways in the active/standby pair are deployed on different host computers for HA purposes.

After deploying the TG gateway, the controller servers 130 configure (at 430) the cloud gateways (e.g., gateway 135) to direct all ingress data message to the entity's VPC that are destined to the received traffic group's list of IP addresses (e.g., to the TG's IP prefix) to the TG gateway that was deployed at 425. As mentioned above, the controller servers configure the cloud gateway by providing next-hop forwarding rules that identify the TG gateway as the next hop of ingress data messages that have destination IP addresses in the IP prefix.

Next, at 435, the controller servers 130 configure the routers that implement the VPC to direct all egress data message exiting the entity's VPC that are from sources with the received traffic group's list of IP addresses (e.g., from the TG's IP prefix) to the TG gateway that was deployed at 425. As mentioned above, the controller servers configure the VPC implementing routers by providing next-hop forwarding rules that identify the TG gateway as the next hop of ingress data messages that have source IP addresses in the IP prefix. After 435, the process ends.

Some embodiments provide policy-driven methods for deploying edge forwarding elements in a public or private SDDC for tenants or applications. For instance, the method of some embodiments allows administrators to create different traffic groups for different applications and/or tenants, deploys edge forwarding elements for the different traffic groups, and configures forwarding elements in the SDDC to direct data message flows of the applications and/or tenants through the edge forwarding elements deployed for them.

Figure 19:
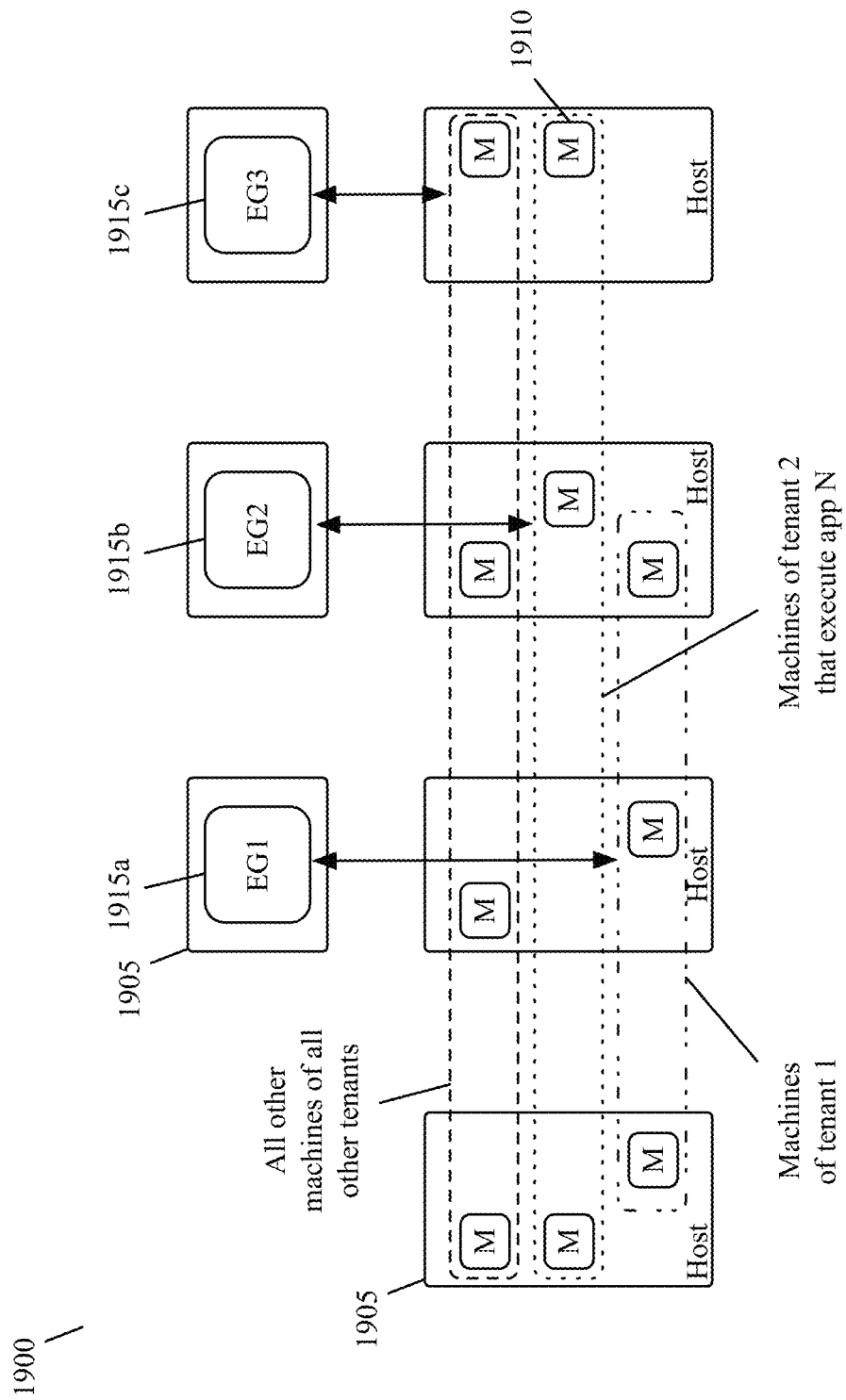
FIG. 19 illustrates an example of deploying different edge gateways for different tenants and applications.

FIG. 19 illustrates one example of such an approach. This figure illustrates a multi-tenant SDDC 1900 that includes several host computers 1905 on which several machines 1910 (e.g., VMs, Pods, containers, etc.) and several edge gateways 1915*a-c* (e.g., edge routers) execute for several tenants of the SDDC 1900. The edge gateways 1915*a-c* in some embodiments operate on host computers and/or standalone appliances on which machines 1910 do not execute. In some embodiments, the SDDC 1900 is a datacenter of a public cloud provider, while in other embodiments the SDDC 1900 is the private datacenter of an entity (e.g., a corporate or other business entity, a school, an organization, etc.).

Three gateways are illustrated in FIG. 19. The first edge gateway 1915*a* is deployed to serve as the gateway of a first tenant. In this capacity, the first gateway 1915*a* forwards data message flows to and from (1) the machines 1910 that are deployed in a first VPC defined in the SDDC 1900 for the first tenant, and (2) the machines outside of this VPC (e.g., the machines outside of the SDDC 1900, or insides the SDDC 1900 but belonging to VPCs of other tenants).

The second edge gateway 1915*b* is deployed to serve as the gateway for a particular application of a second tenant. In some embodiments, this application is implemented by multiple application instances that execute on multiple machines 1910 and that perform a common set of operations for the application. In other embodiments, this application is a multi-component application (e.g., a multi-tier application (such as a three-tier application) or a micro-service application) with multiple sets of application instances that execute on multiple machines, different sets of application instances performing different operations of different components of the multi-component application, and application instances in the same set of application instances performing a common set of operations associated with their respective application component.

In its gateway capacity for the particular application of the second tenant, the second gateway 1915*b* forwards data message flows to and from (1) the machines 1910 that are deployed in a second VPC defined in the SDDC 1900 for the second tenant, and (2) the machines outside of the second VPC (e.g., the machines outside of the SDDC 1900, or inside the SDDC 1900 but belonging to VPCs of other tenants).

In the example of FIG. 19, the third gateway 1915*c* forwards ingress and egress data message flows to and from all other machines 1910 that are deployed in their respective networks in the SDDC from and to external networks. These machines 1910 include machines of tenants 3 through N, where N is an integer. These machines 1910 also include machines of the second tenant that do not execute the particular application for which the second edge gateway 1915*b* was deployed.

Figure 20:
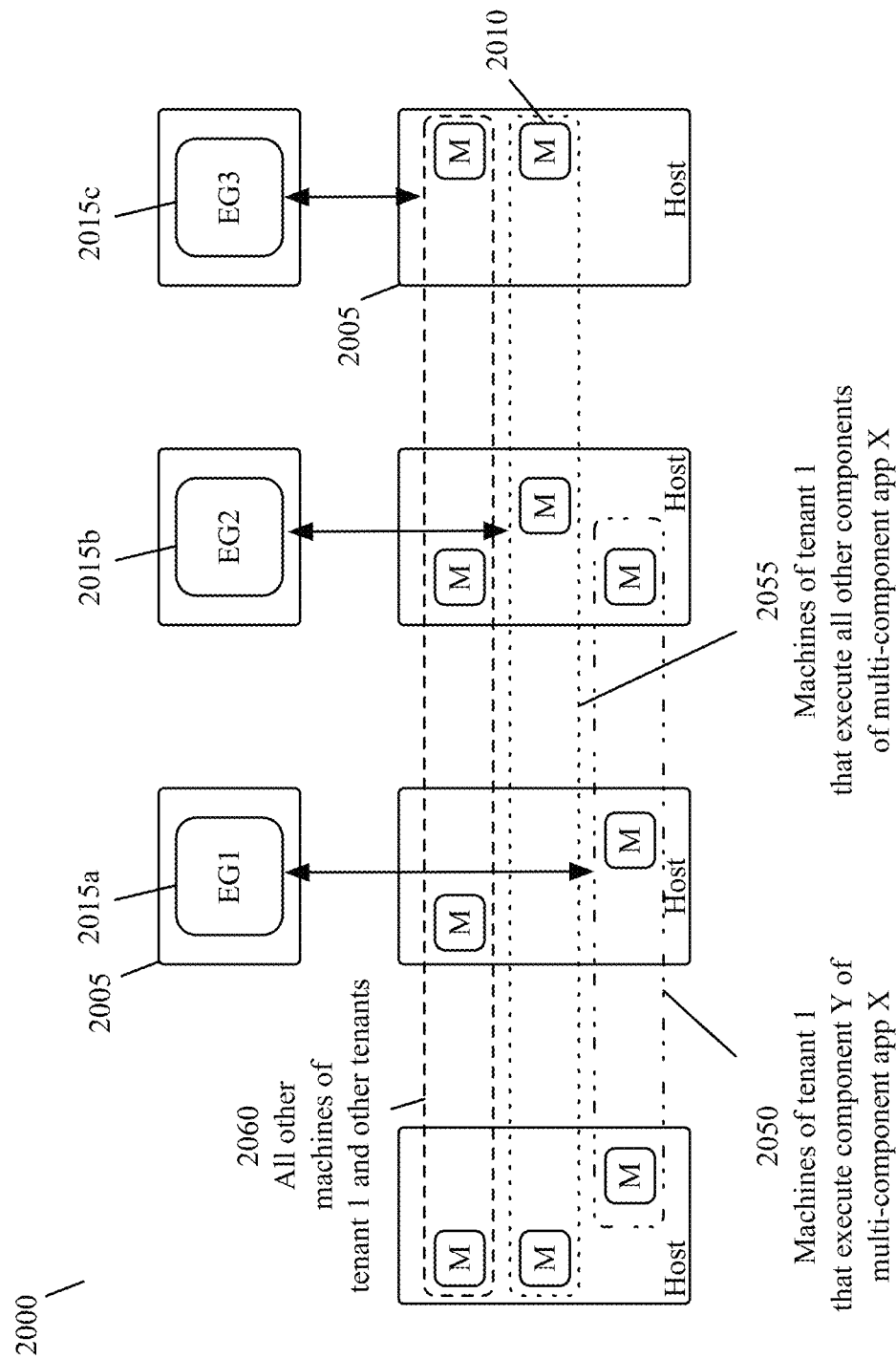
FIG. 20 illustrates an example of deploying different edge gateways for different components of a multi-component application of a tenant in a multi-tenant SDDC.

FIG. 20 illustrates another example of deploying different edge forwarding elements for different sets of machines. In this example, different edge gateways are deployed for different components of a multi-component application of a tenant in a multi-tenant SDDC 2000. This figure illustrates a multi-tenant SDDC 2000 that includes several host computers 2005 on which several machines 2010 (e.g., VMs, Pods, containers, etc.) and several edge gateways 2015*a-c* (e.g., edge routers) execute for several tenants of the SDDC 2000. The edge gateways 2015*a-c* in some embodiments operate on host computers and/or standalone appliances on which machines 2010 do not execute. In some embodiments, the SDDC 2000 is a datacenter of a public cloud provider, while in other embodiments the SDDC 2000 is the private datacenter of an entity (e.g., a corporate or other business entity, a school, an organization, etc.).

Three gateways are illustrated in FIG. 20. The first edge gateway 2015*a* is deployed to serve as the gateway for a component Y of a multi-component application X that is deployed for a first tenant and that executes on multiple computers 2005 in the SDDC 2000. In this capacity, the first gateway 2015*a* forwards data message flows to and from (1) the machines 2010 that execute application component Y and that are deployed in a first VPC defined in the SDDC 2000 for the first tenant, and (2) the machines outside of this VPC (e.g., the machines outside of the SDDC, or insides the SDDC but belonging to VPCs of other tenants).

The multi-component application X in some embodiments is a multi-tier application, such as a three-tier application, with the first tier formed by a set of one or more webservers, the second tier formed by a set of one or more app servers, and the third tier formed by a set of one or more database servers. In other embodiments, the multi-component application X is a micro-service application with many different tiers of components and each tier having many different tier application instances. In many of these embodiments, each application-component tier includes several application instances that perform the common set of operations of that application component, and that execute on several machines 2010. In these embodiments, different sets of application instances that are deployed for different application-component tiers perform different operations of the different components of the multi-component application. In FIG. 20, the group of machines 2050 perform the operations of the application component X, and utilize the first edge gateway 2015a to exchange packets with machines outsides of the VPC that is defined for the first tenant in the SDDC 2000.

The second edge gateway 2015b is deployed to serve as the gateway for the rest of the components of the multi-component application X. In this capacity, the second gateway 2015b forwards data message flows to and from (1) the group of machines 2055 on which these other components of the multi-component application X execute, and (2) the machines outside of the VPC that is deployed for the first tenant in the SDDC 2000.

In FIG. 20, the third gateway 2015c forwards ingress and egress data message flows to and from all other machines 2010 that are deployed in their respective networks in the SDDC 20000 from and to external networks. These machines includes machines of several other tenants of the SDDC 2000 as well as the first tenant's machines that do not execute the multi-component application X. In FIG. 20, these other machines are depicted as the group of machines 2060.

The policy-driven method of some embodiments also deploys edge forwarding elements in the SDDC for applications and/or tenants after detecting the need for the edge forwarding elements based on monitored traffic flow conditions. For instance, the method of some embodiments deploys, for a set of one or more applications, a first edge forwarding element to process data message flows associated with the application set. The method detects that the data message flows associated with the application set consume more than a threshold amount of bandwidth. Based on a policy that specifies allocation of additional bandwidth for data message flows associated with the application set when the data message flows consume more than the threshold amount, the method determines that additional bandwidth needs to be allocated for the data message flows associated with the application set in response to the detection, and then deploys, for the application set, a second edge forwarding element to process at least a portion of the data message flows associated with the application set in order to allocate more bandwidth to the application set. In some embodiments, the deploying, detecting, and determining operations are performed by a set of one or more controllers.

In some embodiments, the application set includes only one application that is implemented by several application instances executing on a several host computers, with all the application instances performing a common set of operations of the application. Before the deployment of the second edge forwarding element, the first edge forwarding element processes all the data message flows of all the application instances of the application. After the deployment of the second edge forwarding element, the first edge forwarding element processes the data message flows of a first set of application instances of the application, while the second edge forwarding element processes the data message flows of a second set of application instances of the application.

Conjunctively, or alternatively, the application set in some embodiments includes a first application and a second application different from the first application. The first application is implemented by several application instances executing on a first set of one or more host computers to perform a common set of operations of the first application, while the second application is implemented by several application instances executing on a second set of one or more host computers to perform a common set of operations of the second application.

Before the deployment of the second edge forwarding element, the first edge forwarding element processes all of the data message flows of all of the application instances of the first and second applications. After the deployment of the second edge forwarding element, the first edge forwarding element processes the data message flows of the application instances of the first application, while the second edge forwarding element processes the data message flows of the application instances of the second application.

In some embodiments, the application set includes a multi-component application with several components that execute on several computers. Before the deployment of the second edge forwarding element, the first edge forwarding element processes all the data message flows of each component of the application. After the deployment of the second edge forwarding element, the first edge forwarding element processes the data message flows of a first component of the first application, while the second edge forwarding element processes the data message flows of a second component of the application.

Conjunctively, or alternatively, the method of some embodiments deploys, for a tenant in a multi-tenant SDDC, a first edge forwarding element to process data message flows associated with the machines of the tenant that operate in the SDDC. The method then detects that these data message flows consume more than a threshold amount of bandwidth. Based on a policy that specifies allocation of additional bandwidth for data message flows associated with the tenant when its data message flows consume more than the threshold amount, the method determines that additional bandwidth needs to be allocated for the data message flows to and/or from the machines of the tenant in response to the detection, and then deploys, for the tenant, a second edge forwarding element to process at least a portion of its data message flows in order to allocate more bandwidth to the tenant's machines.

The deploying, detecting, and determining operations in some embodiments are performed by a set of one or more controllers. Also, in some embodiments, the SDDC is a datacenter that belongs to a multi-tenant public cloud operated by a public cloud provider that provides compute resources, network resources, and/or storage resources from multiple tenants. In other embodiments, the SDDC is a private datacenter of an entity (e.g., a corporation, school, organization, etc.), and the tenants are different sub-entities (e.g., divisions, departments, etc.) associated with the entity.

After the deployment of the second edge forwarding element for the tenant, the first edge forwarding element continues to process a first set of data message flows associated with the tenant, while the second edge forwarding element processes a second set of data message flows associated with the tenant. In some embodiments, the first set of data message flows are for a first set of machines of the tenant, while the second set of data message flows are for a second set of machines of the tenant. Both sets of data message flows (i.e., the first and second data message flows) are between machines in a first network that is defined in the SDDC for the tenant and machines external to the first network of the SDDC (i.e., are flows entering or exiting the first network).

Figure 21:
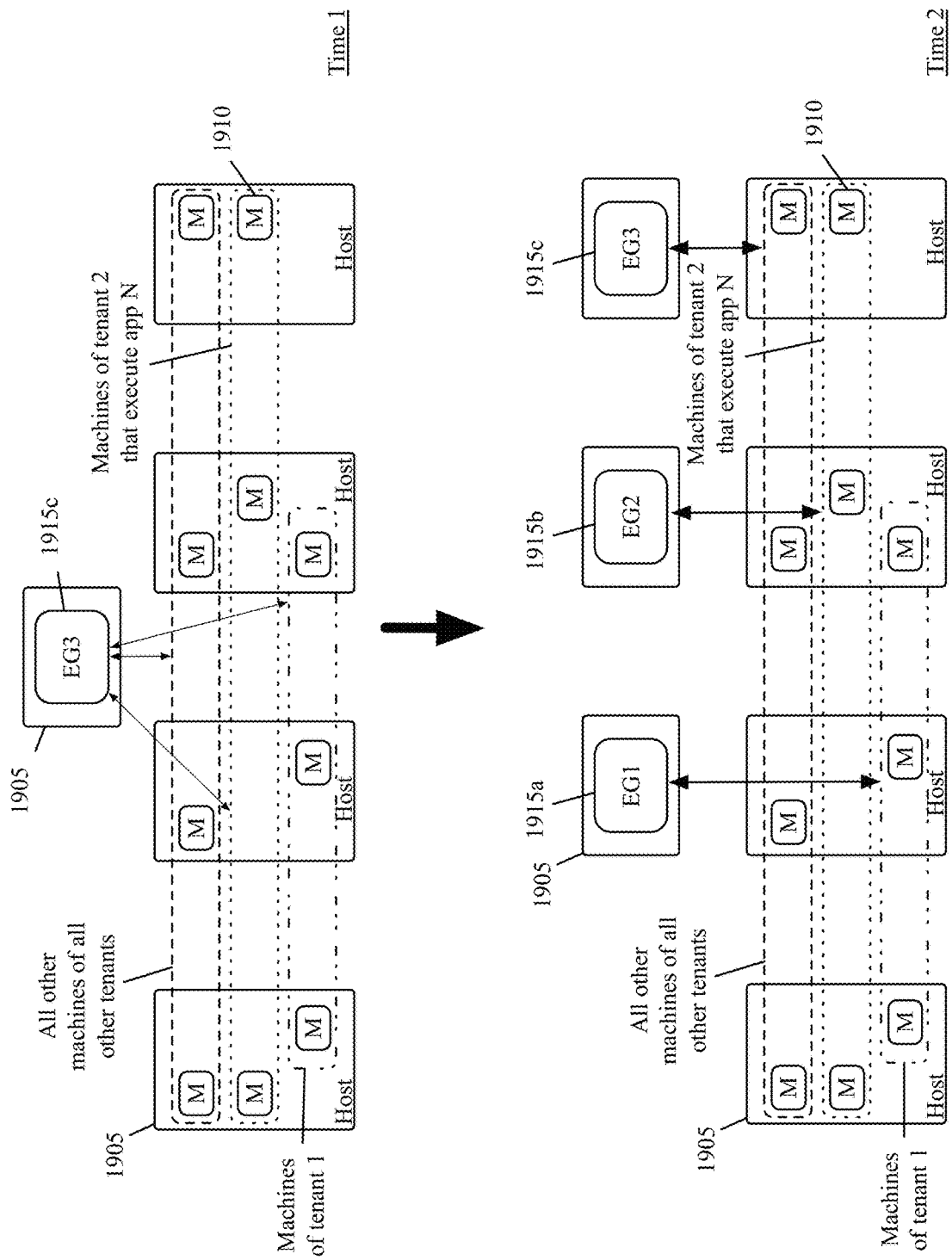
FIG. 21 illustrates the policy-driven method of some embodiments deploying edge forwarding elements in the SDDC for applications and tenants after detecting the need for the edge forwarding elements based on monitored traffic flow conditions.

FIG. 21 illustrates an example of the policy-driven method of some embodiments deploying edge forwarding elements in the SDDC for applications and tenants after detecting the need for the edge forwarding elements based on monitored traffic flow conditions. This figure elaborates on the example that was previously described by reference to FIG. 19. It shows that before the first and second edge forwarding elements 1915a and 1915b are respectively deployed for the machines of tenant 1 and the machines of tenant 2 that execute the application N, the third edge forwarding element 1915c is deployed at a first time instance to handle all external data message traffic for these machines.

It also illustrates that by a second time instance, the first edge forwarding element 1915a has been deployed for the machines of tenant 1, and the second edge forwarding element 1915b has been deployed for the machines of tenant 2 that execute the application N. The SDDC controller set in some embodiments deploys the first and second edge forwarding elements 1915a and 1915b after detecting a particular level of data message flows for these machines and/or detecting a particular level of congestion for (e.g., a particular level of data message flow through) the third edge gateway 1915c.

Figure 22:
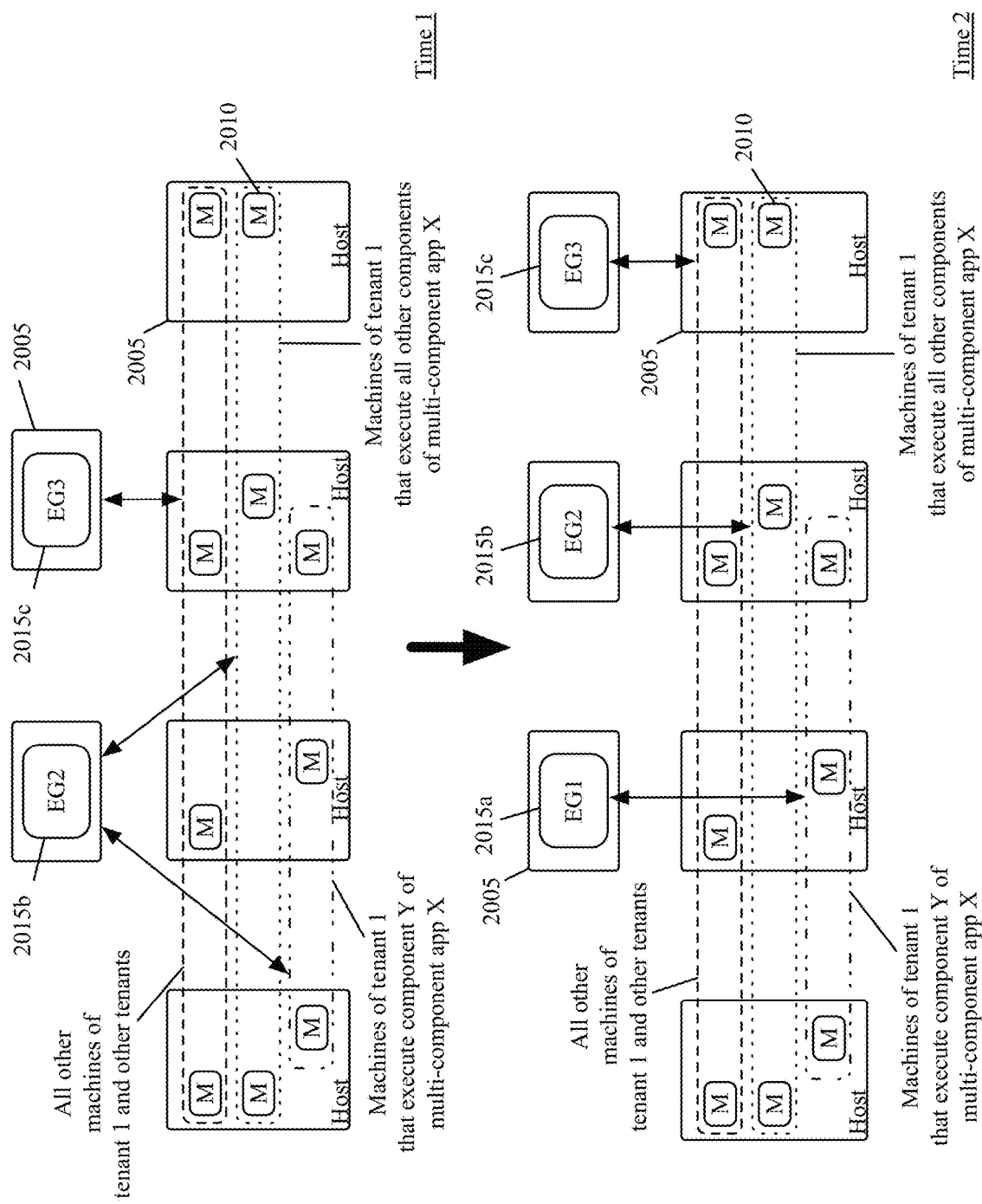
FIG. 22 illustrates the policy-driven method of some embodiments deploying edge forwarding elements in the SDDC for application components of a multi-component application after detecting the need for the edge forwarding elements based on monitored traffic flow conditions.

FIG. 22 illustrates an example of the policy-driven method of some embodiments deploying edge forwarding elements in the SDDC for application components of a multi-component application after detecting the need for the edge forwarding elements based on monitored traffic flow conditions. This figure elaborates on the example that was previously described by reference to FIG. 20.

This figure shows that before the first edge forwarding element 2015a was deployed for the machines of tenant 1 that execute the component Y of the multi-component application X, the second edge forwarding element 2015b is deployed at a first time instance to handle all external data message traffic for all of the machines that execute the application X. It also illustrates that the third edge forwarding element 2015c is deployed at the first time instance to handle all other external data message traffic for the first tenant and several other tenants of the SDDC.

FIG. 22 illustrates that by a second time instance, the first edge forwarding element 2015a has been deployed for the tenant 1 machines that execute the component Y of the multi-component application X. A this time, the second edge forwarding element 2015b handles all external data message traffic for all of the machines that execute the other components of the application X (i.e., the application X machines that do not execute the component Y). At this instance in time, the third edge forwarding element 2015c continues handling all other external data message traffic for the first tenant and several other tenants of the SDDC. The SDDC controller set in some embodiments deploys the first and second edge forwarding elements 2015a and 2015b after detecting a particular level of data message flows for these machines and/or detecting a particular level of congestion for (e.g., a particular level of data message flow through) the second edge gateway 2015b.

Figure 23:
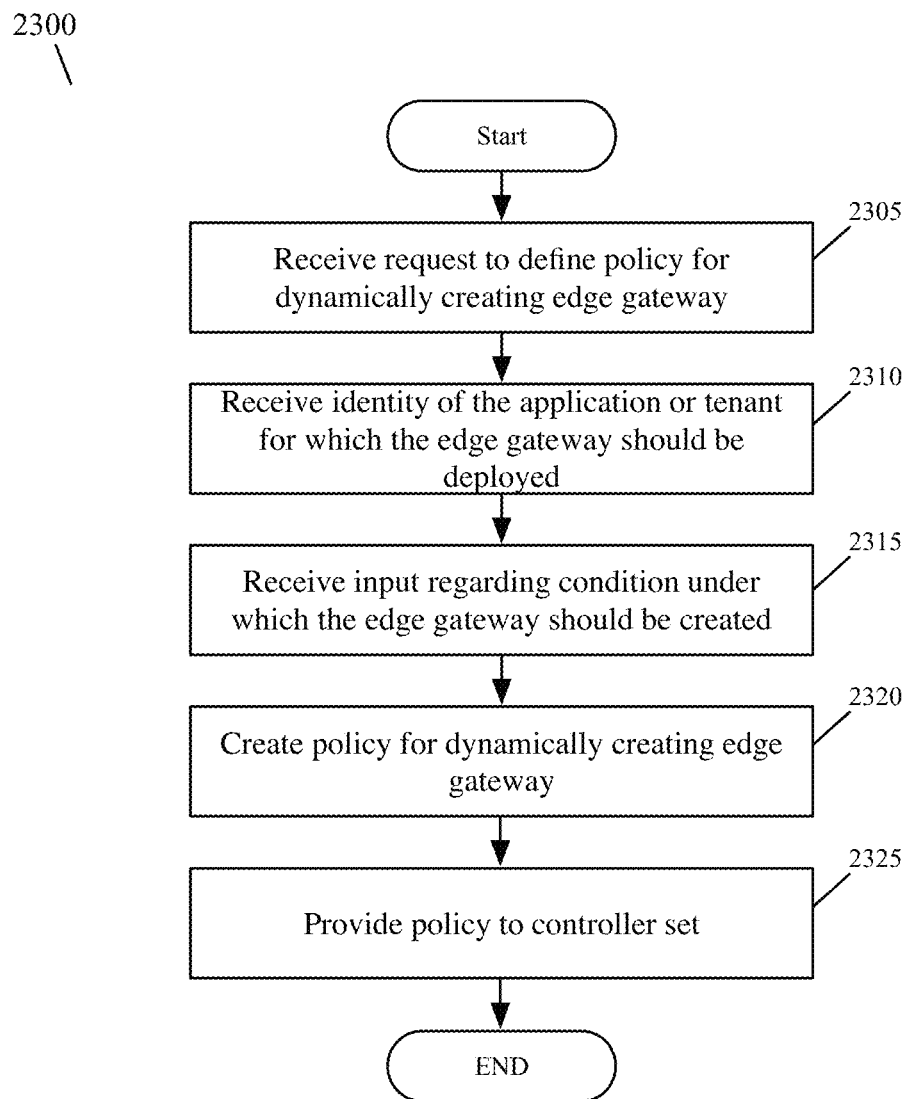
FIG. 23 conceptually illustrates a process performed by a network manager that defines a policy for dynamically creating an edge gateway to allocate more bandwidth to a particular application or tenant.

FIG. 23 illustrates a process 2300 that defines a policy for dynamically creating an edge gateway to allocate more bandwidth to a particular application or tenant. This process 2300 is performed by a network manager that receives user input through APIs or a user interface of the network manager. As shown, the process 2300 starts when the network manager receives (at 2305) a request to define a policy for dynamically creating an edge gateway. This request is received in some embodiments when an administrator selects a webpage through which such a policy can be created.

This webpage is similar to those described above by reference to FIGS. 5-18. Using this webpage, the administrator defines a traffic group for which the newly created edge gateway will be created, except that this web page has one or more controls through which the administrator can specify the conditions under which the traffic group (i.e., its edge gateway) should be dynamically deployed. Other embodiments use the webpage that has controls for specifying (1) the conditions under which a edge gateway should be dynamically deployed and (2) the application, the application-component and/or tenant for which this edge gateway should be dynamically deployed.

Through the web interface or API interface, the process 2300 receives (at 2310) the identity of the application, the application-component, and/or tenant for which this edge gateway should be dynamically deployed. As described above by reference to FIGS. 19-22, some embodiments allow an edge gateway to be dynamically deployed for a tenant, an application, or a component of a multi-component application. Once deployed, this gateway would process the north/south data message flows in some embodiments for all of the machines of the tenant, the machines that execute all the instances of the application, or the machines that execute all the instances of the application component.

In some embodiments, the identity of the application or application component are specified in terms of the virtual IP addresses associated with the application or application component, while in other embodiments this identity is provided through other means (e.g., through another identifier (e.g., a name) associated with the application or application component). Similarly, some embodiments allow the administrator to identify a tenant for which the gateway is to be dynamically deployed through a tenant identifier (e.g., an alphanumeric name associated with the tenant), or through a range of network addresses (e.g., a subnet or IP range) associated with the tenant.

Next, at 2315, the process 2300 receives input regarding the conditions under which the edge gateway should be dynamically deployed. This condition can be specified differently in different embodiments. Some embodiments allow this condition to be specified in terms of one or more metrics (e.g., number of packets, number of bytes, number of connections, number of connections per second) associated with a gateway that is used by the tenant, application, or application-component prior to the operation of the dynamically deployed gateway for the tenant, application or application-component. For one or more such metrics, the network administrator in some embodiments can specify through the web interface of the network manager one or more threshold values. When the network controller set detects based on statistics that it collects that any of these threshold values or a combination of these values are crossed (e.g., are exceeded), the network controller set dynamically deploys the gateway for the tenant, application, or application-component.

At 2320, the process 2300 creates a policy based on the input provided at 2310 and 2315. This policy specifies a set of conditions under which the controller set should dynamically deploy an edge gateway for the tenant, application, or application-component. Next, at 2325, the process 2300 distributes this generated policy to the controller set to enforce. After 2325, the process 2300 ends.

Figure 24:
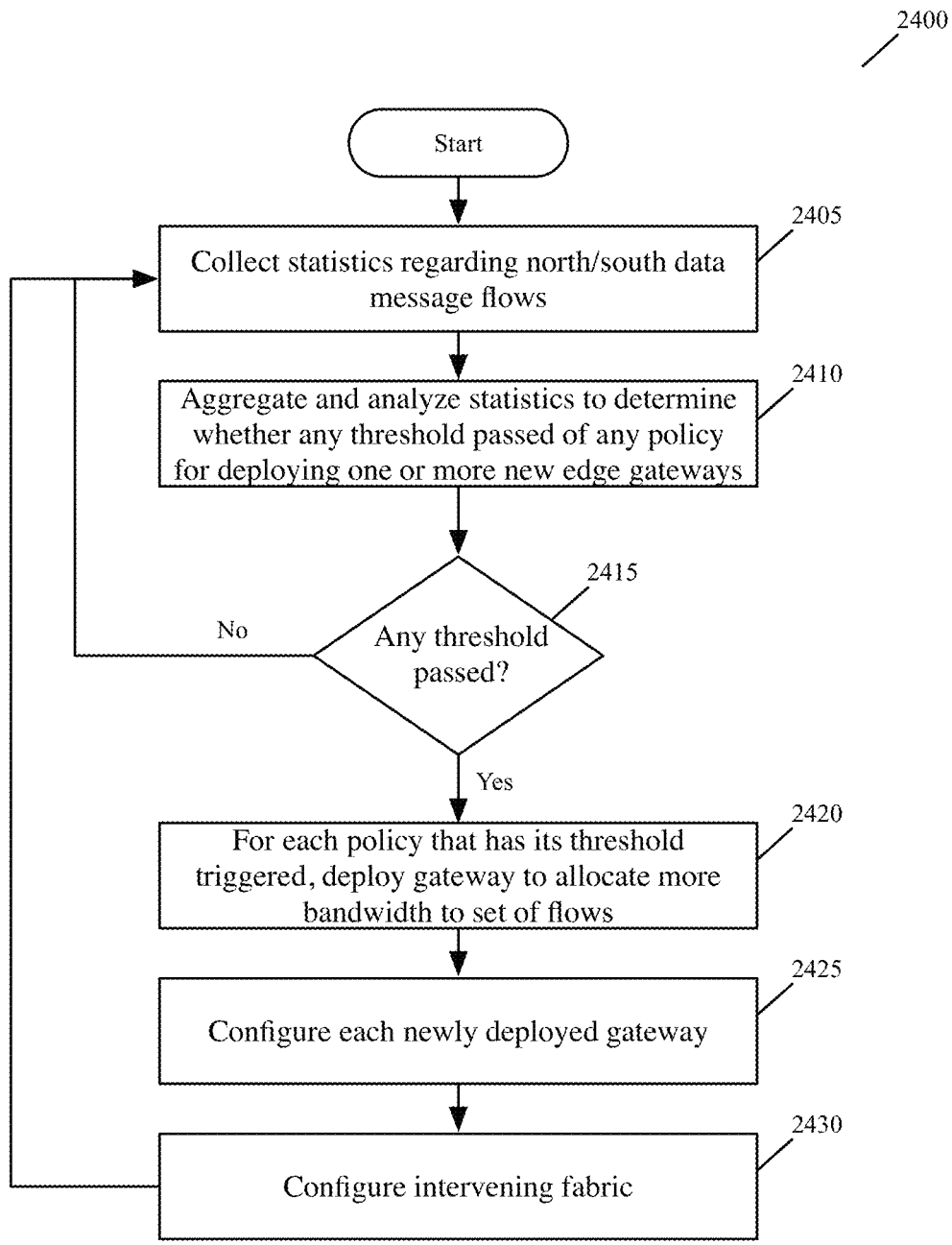
FIG. 24 conceptually illustrates a process performed by a controller set to dynamically deploy edge gateways based on the policies specified by the process conceptually illustrated in FIG. 23.

FIG. 24 illustrates a process 2400 that the controller set performs to dynamically deploy edge gateways based on the policies specified by the process 2300. This process 2400 continuously collects (at 2405) statistics from forwarding elements in the SDDC regarding data message flows traversing through edge gateways that are deployed in the SDDC for tenants and/or applications for which policies are defined for dynamically deploying edge gateways.

For each policy, the process collects statistics that are relevant for evaluating the conditions specified for dynamically deploying the edge gateway specified by the policy for the tenant, application or application component specified by the policy. Specifically, in some embodiments, the statistics that are collected for a policy are for one or more metrics that are used to define the conditions specified by the policy. These metrics are associated with the data message flows processed by one or more other edge gateway for the set of machines for which the policy is specified (e.g., the set of machines of a tenant, or the set of machines executing an application or application component, for which the policy is defined). The collected statistics in some embodiments are also for these metrics as they relate to the data message flows processed by these other gateway for other sets of machines (e.g., machines of other tenants or machines executing other application or application instances).

The process 2400 in some embodiments uses a pull model to proactively retrieve statistics from the SDDC forwarding elements, while in other embodiments it uses a push model to passively receive statistics form these forwarding elements. In some embodiments, the process 2400 retrieves or receives statistics from just the SDDC edge gateways, while in other embodiments this process 2400 retrieves or receives the statistics from edge and non-edge forwarding elements in the SDDC.

At 2410, the process 2400 repeatedly aggregates and analyzes (at 2410) the statistics that it collects, in order to determine whether any threshold has been passed for deploying one or more dynamic gateways. Each threshold in some embodiments relates to the value that is collected and aggregated for one metric, while in other embodiments each threshold relates to a set of values that is collected for a set of metrics that are then aggregated through a blending function (e.g., added through a weighted sum). In still other embodiments, some thresholds are associated with one metric value, while others are associated with several metric values. A At 2415, the process determines whether any thresholds were passed. If not, it returns to 2405 to collect additional statistics. On the other hand, when the process 2400 determines that one or more thresholds have been passed (e.g., have been exceeded), the process 2400 deploys (at 2420) a gateway for each policy that the process 2400 identified as having its threshold triggered (i.e., passed) at 2415.

In some embodiments, deploying each edge gateway simply entails creating a record in a data store (e.g., a database table) associating a previously deployed edge gateway with a particular tenant, application, or application component. In other embodiments, this deployment entails newly instantiating a edge forwarding element to operate on a host computer or edge appliance.

After 2420, the process 2400 configures each newly deployed edge gateway to process north and south bound data message traffic from the tenant, application, or application component for which it is deployed. This configuration in some embodiments entails configuring the edge gateways to externally advertise routes (i.e., to advertise routes to external routers) regarding the SDDC network of the tenant, application, or application component for which the gateway is deployed. This configuration also entails configuring the edge gateway to perform destination-side routing to ensure that the SDDC gateway (e.g., cloud gateway 135) forwards all of the ingress data messages to the machines of the tenant, application, or application component to the newly deployed gateway.

At 2425, the process 2400 configures the intervening fabric (i.e., intervening forwarding elements) in the SDDC to use the newly deployed edge gateway for the northbound data message traffic (i.e., for the egress data message flows from the machines of the tenant, application or application component that leave its VPC through the newly deployed gateway). In some embodiments, this configuration entails configuring these intervening forwarding elements to perform source-side routing to ensure that the forwarding elements of the VPC network forward all the egress data messages from the machine of the tenant, application, or application component to the newly deployed gateway. The source- and destination-side routing operate in the same manner as described above.

Figure 25:
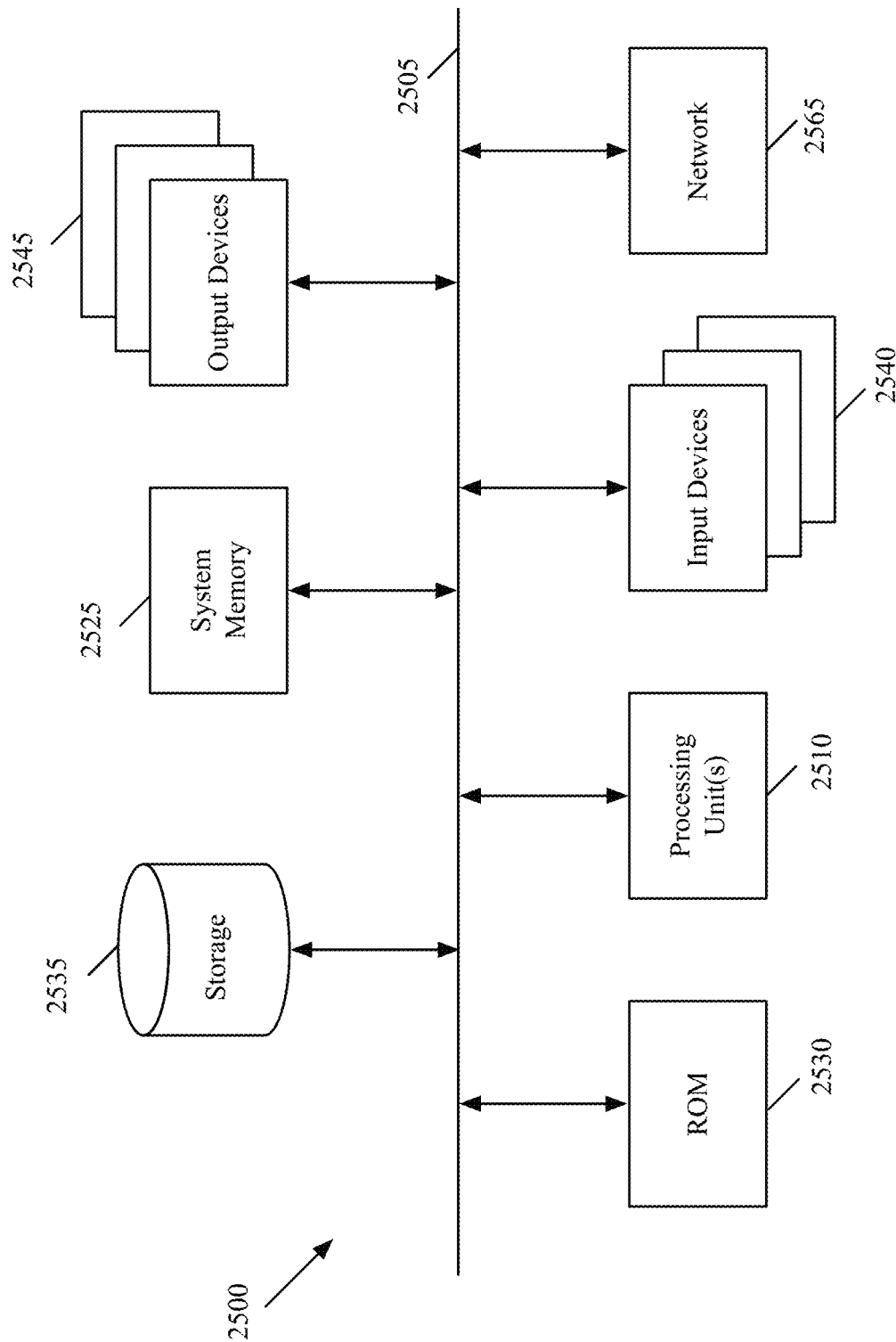
FIG. 25 illustrates a computer system with each some embodiments of the invention can be implemented.

FIG. 25 conceptually illustrates a computer system 2500 with which some embodiments of the invention are implemented. The computer system 2500 can be used to implement any of the above-described hosts, controllers, and managers. As such, it can be used to execute any of the above described processes. This computer system 2500 includes various types of non-transitory machine-readable media and interfaces for various other types of machine readable media. Computer system 2500 includes a bus 2505, processing unit(s) 2510, a system memory 2525, a read-only memory 2530, a permanent storage device 2535, input devices 2540, and output devices 2545.

The bus 2505 collectively represents all system, peripheral, and chipset buses that communicatively connect the numerous internal devices of the computer system 2500. For instance, the bus 2505 communicatively connects the processing unit(s) 2510 with the read-only memory 2530, the system memory 2525, and the permanent storage device 2535.

From these various memory units, the processing unit(s) 2510 retrieve instructions to execute and data to process in order to execute the processes of the invention. The processing unit(s) may be a single processor or a multi-core processor in different embodiments. The read-only-memory (ROM) 2530 stores static data and instructions that are needed by the processing unit(s) 2510 and other modules of the computer system 2500. The permanent storage device 2535, on the other hand, is a read-and-write memory device. This device 2535 is a non-volatile memory unit that stores instructions and data even when the computer system 2500 is off. Some embodiments of the invention use a mass-storage device (such as a magnetic or optical disk and its corresponding disk drive) as the permanent storage device 2535.

Other embodiments use a removable storage device (such as a floppy disk, flash drive, etc.) as the permanent storage device 2535. Like the permanent storage device 2535, the system memory 2525 is a read-and-write memory device. However, unlike storage device 2535, the system memory 2525 is a volatile read-and-write memory, such as random access memory. The system memory 2525 stores some of the instructions and data that the processor needs at runtime. In some embodiments, the invention's processes are stored in the system memory 2525, the permanent storage device 2535, and/or the read-only memory 2530. From these various memory units, the processing unit(s) 2510 retrieve instructions to execute and data to process in order to execute the processes of some embodiments.

The bus 2505 also connects to the input and output devices 2540 and 2545. The input devices 2540 enable the user to communicate information and select requests to the computer system 2500. The input devices 2540 include alphanumeric keyboards and pointing devices (also called "cursor control devices"). The output devices 2545 display images generated by the computer system 2500. The output devices 2545 include printers and display devices, such as cathode ray tubes (CRT) or liquid crystal displays (LCD). Some embodiments include devices such as touchscreens that function as both input and output devices 2540 and 2545.

Finally, as shown in FIG. 25, bus 2505 also couples computer system 2500 to a network 2565 through a network adapter (not shown). In this manner, the computer 2500 can be a part of a network of computers (such as a local area network ("LAN"), a wide area network ("WAN"), or an Intranet), or a network of networks (such as the Internet). Any or all components of computer system 2500 may be used in conjunction with the invention.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Some embodiments include electronic components, such as microprocessors, that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several of the above-described embodiments allocate more bandwidth to a set of data message flows by having an administrator request the creation of a new traffic group, associating a set of network addresses with this traffic group, and then deploying a new gateway for the traffic group in order to process ingress/egress traffic associated with the set of network addresses. Other embodiments, however, have the administrator simply request a specific amount (e.g., a certain amount of bytes/second) or a general amount (e.g., high, medium, low, etc.) of ingress/egress bandwidth for a set of data message flows. Thus, one of ordinary skill in the art would understand that the invention is not to be limited by the foregoing illustrative details, but rather is to be defined by the appended claims.

We claim:

1. A method of deploying edge gateways in a software defined datacenter (SDDC), the method comprising:
   receiving identity of a set of machines that operate within a first network of the SDDC and that utilize a first edge gateway to exchange data messages with a second network external to the first network;
   receiving a set of one or more conditions that when met should result in a dynamic deployment of a second edge gateway for the set of machines;
   generating a policy identifying the set of machines and the set of conditions; and
   distributing the policy to a set of controllers that evaluate the policy to determine whether the second edge gateway has to be dynamically deployed to exchange data messages between the set of machines and the external second network, wherein the set of controllers collects statistics from a set of elements in the first network, and aggregates and analyzes the collected statistics to determine whether the set of conditions have been met to deploy the edge gateway.

2. The method of claim 1, wherein the receiving, generating and distributing is performed by a set of network managers.

3. The method of claim 1, wherein the collected statistics comprise statistics collected from particular edge gateway used for sending and receiving data messages from and to the set of machines.

4. The method of claim 3, wherein the particular edge gateway is also used to send and receive data messages from other sets of machines in the SDDC.

5. The method of claim 4, wherein the set of conditions comprises at least one threshold relating to a metric associated with the data message flows processed by the particular edge gateway for the set of machines and the other sets of machines.

6. The method of claim 5, wherein when the threshold is reached, the controller set deploys the second edge gateway and configures a set of other forwarding elements in the SDDC to forward data messages that are entering or exiting the SDDC and are associated with the set of machines to the second edge gateway.

7. The method of claim 1, wherein the SDDC is a multi-tenant SDDC, and the set of machines are a set of machines associated with a tenant of the multi-tenant SDDC.

8. The method of claim 1, wherein the set of machines comprises a plurality of machines that execute a plurality of application instances for an application for which the second edge gateway is to be dynamically deployed.

9. The method of claim 1, wherein the set of machines comprises a plurality of machines that execute a plurality of application instances for a component of a multi-component application for which the second edge gateway is to be dynamically deployed.

10. A non-transitory machine readable medium storing a program for deploying edge gateways in a software defined datacenter (SDDC), the program comprising sets of instructions for:
   receiving identity of a set of machines that operate within a first network of the SDDC and that utilize a first edge gateway to exchange data messages with a second network external to the first network;
   receiving a set of one or more conditions that when met should result in a dynamic deployment of a second edge gateway for the set of machines;
   generating a policy identifying the set of machines and the set of conditions; and
   distributing the policy to a set of controllers that evaluate the policy to determine whether the second edge gateway has to be dynamically deployed to exchange data messages between the set of machines and the external second network, wherein the set of controllers collects statistics from a set of elements in the first network, and aggregates and analyzes the collected statistics to determine whether the set of conditions have been met to deploy the edge gateway.

11. The non-transitory machine readable medium of claim 10, wherein the program is a program executed by a network manager.

12. The non-transitory machine readable medium of claim 10, wherein the collected statistics comprise statistics collected from at least a particular edge gateway used for sending and receiving data messages from and to the set of machines.

13. The non-transitory machine readable medium of claim 12, wherein the particular edge gateway is also used to send and receive data messages from other sets of machines in the SDDC.

14. The non-transitory machine readable medium of claim 13, wherein the set of conditions comprises at least one threshold relating to a metric associated with the data message flows processed by the particular edge gateway for the set of machines and the other sets of machines.

15. The non-transitory machine readable medium of claim 14, wherein when the threshold is reached, the controller set deploys the second edge gateway and configures a set of other forwarding elements in the SDDC to forward data messages that are entering or exiting the SDDC and are associated with the set of machines to the second edge gateway.

16. The non-transitory machine readable medium of claim 10, wherein the SDDC is a multi-tenant SDDC, and the set of machines are a set of machines associated with a tenant of the multi-tenant SDDC.

17. The non-transitory machine readable medium of claim 10, wherein the set of machines comprises a plurality of machines that execute a plurality of application instances for an application for which the second edge gateway is to be dynamically deployed.

18. The non-transitory machine readable medium of claim 10, wherein the set of machines comprises a plurality of machines that execute a plurality of application instances for a component of a multi-component application for which the second edge gateway is to be dynamically deployed.

* * * * *